(12) United States Patent
Little

(10) Patent No.: US 7,667,429 B2
(45) Date of Patent: Feb. 23, 2010

(54) BATTERY PACK AUTHENTICATION FOR A MOBILE DEVICE

(75) Inventor: Herbert Little, Waterloo (CA)

(73) Assignee: Research In Motion Limited, Waterloo, Ontario (CA)

(*) Notice: Subject to any disclaimer, the term of this patent is extended or adjusted under 35 U.S.C. 154(b) by 264 days.

(21) Appl. No.: 11/549,383

(22) Filed: Oct. 13, 2006

(65) Prior Publication Data

US 2007/0123316 A1 May 31, 2007

Related U.S. Application Data

(60) Provisional application No. 60/726,164, filed on Oct. 14, 2005.

(51) Int. Cl.
| | |
|---|---|
| H02J 7/00 | (2006.01) |
| H04K 1/00 | (2006.01) |
| H04L 9/00 | (2006.01) |
| B41K 3/38 | (2006.01) |
| H04M 1/66 | (2006.01) |
| H04M 1/68 | (2006.01) |
| H04M 3/16 | (2006.01) |
| H04L 29/06 | (2006.01) |

(52) U.S. Cl. .............. 320/106; 380/2; 380/59; 380/247; 380/270; 455/410; 455/411; 713/160; 713/161; 713/166

(58) Field of Classification Search ............. 455/410, 455/411; 320/106; 713/160, 161, 166; 380/2, 380/59, 247, 270
See application file for complete search history.

(56) References Cited

U.S. PATENT DOCUMENTS

| | | | |
|---|---|---|---|
| 5,255,146 | A | 10/1993 | Miller |
| 5,587,924 | A | 12/1996 | Rossi |
| 6,114,831 | A | 9/2000 | Attimont et al. |

(Continued)

FOREIGN PATENT DOCUMENTS

EP 0 966 090 A2 12/1999

(Continued)

OTHER PUBLICATIONS

Isidor Buchmann, "The 'Smart' Battery," BatteryUniversity.com, http://www.batteryuniversity.com/partone-17.htm.*

(Continued)

*Primary Examiner*—Nick Corsaro
*Assistant Examiner*—Larry Sternbane
(74) *Attorney, Agent, or Firm*—Bereskin & Parr LLP/S.E.N.C.R.L., s.r.l.

(57) ABSTRACT

Various embodiments are described herein for a mobile communication device that authenticates a smart battery prior to use. The mobile device includes a main processor and a device memory. The device memory stores first and second portions of security information used for authentication. The smart battery includes a battery processor and a battery memory. The battery memory stores a third portion of security information used for authentication. The main processor sends an authentication request including the first portion of security information to the battery processor, and the battery processor generates a response based on the first and third portions of security information and sends the generated response to the main processor. The smart battery is authenticated if the generated response matches the second portion of security information.

17 Claims, 9 Drawing Sheets

U.S. PATENT DOCUMENTS

| | | | |
|---|---|---|---|
| 6,173,350 | B1 | 1/2001 | Hudson et al. |
| 6,219,417 | B1 | 4/2001 | Zhou |
| 6,429,622 | B1 | 8/2002 | Svensson |
| 6,975,092 | B2 * | 12/2005 | Edington et al. ............ 320/106 |
| 7,250,612 | B2 * | 7/2007 | Pai-Paranjape et al. ... 250/461.1 |
| 7,388,466 | B2 * | 6/2008 | Ghabra et al. .............. 340/5.61 |
| 7,512,795 | B2 * | 3/2009 | Buskey et al. ............... 713/168 |
| 7,596,699 | B2 * | 9/2009 | Kwok ......................... 713/176 |
| 2003/0062872 | A1 | 4/2003 | Brotto |
| 2003/0074572 | A1 | 4/2003 | Hayashi |
| 2004/0121801 | A1 | 6/2004 | Tom |
| 2004/0145487 | A1 | 7/2004 | Wendelrup et al. |
| 2005/0001589 | A1 | 1/2005 | Edington et al. |
| 2005/0066065 | A1 | 3/2005 | Barus et al. |
| 2005/0188206 | A1 | 8/2005 | Kwok |
| 2006/0178170 | A1 * | 8/2006 | Chung et al. ................. 455/572 |
| 2006/0204004 | A1 * | 9/2006 | Shankar et al. ............... 380/44 |
| 2007/0123303 | A1 | 5/2007 | Book et al. |
| 2007/0123304 | A1 | 5/2007 | Pattenden et al. |

FOREIGN PATENT DOCUMENTS

| | | |
|---|---|---|
| EP | 0 991 161 A1 | 5/2000 |
| JP | 08111674 | 4/1996 |
| WO | 9720338 | 6/1997 |
| WO | WO 97/20338 | 6/1997 |
| WO | 0045495 | 8/2000 |
| WO | WO 00/45495 | 8/2000 |

OTHER PUBLICATIONS

Extended European Search Report For European Patent Application EP 06122298.0, dated May 4, 2007.

Examination Report for European Patent Application EP 06122299.8, dated Dec. 17, 2007.

Menezes et al., "Handbook of Applied Cryptography, Challenge-Response Identification (Strong Authentication)" 1997, Handbook of Applied Cryptography, CRC Press series on discrete mathematics and its applications, Boca Raton, FL, CRC Press, US, pp. 397-404.

International Search Report/Written Opinion for corresponding international application PCT/CA2006/001694, date of mailing Feb. 2, 2007.

Extended EP search report for European patent application EP 06122299.8, date of mailing Feb. 26, 2007.

Partial EP search report for European patent application EP 06122298.0, date of mailing Feb. 16, 2007.

International Preliminary Report on Patentability from related International Application No. PCT/CA2006/001694, dated Apr. 24, 2008.

AVR Applications Team, Smart Battery White Paper, Atmel Corporation, San Jose, California, 2003.

Dietz, Ken, Microchip TB086 PIC12F635/PIC16F636/PIC16F639 Cryptographic Module General Overview, Microchip Technology Inc. 2005.

Pages from website http://www.physorg.com/news2677.html. TI Battery Management IC Increases Battery Safety in Cell Phones, Jan. 13, 2005.

News Release from Texas Instruments. Edited by the Electronicstalk Editorial Team on Jan. 13, 2005, Battery management IC takes security onboard.

Product Preview from Texas Instruments, BatteryPack Security and Authentication IC For Portable Applications (bqSECURE™), bq26150, revised Jul. 2005.

Co-pending U.S. Appl. No. 11/549,503, "Interface and Communication Protocol for a Mobile Device with a Smart Battery", Filed Oct. 13, 2006. (Retrievable from PAIR).

United States Office Action dated Jan. 2, 2009, U.S. Appl. No. 11/549,503.

Office Action Response dated May 4, 2009, U.S. Appl. No. 11/549,503.

United States Notice of Allowance dated Jul. 10, 2009, U.S. Appl. No. 11/549,503.

Co-pending U.S. Appl. No. 11/549,461, "Mobile Device with a Smart Battery", Filed Oct. 13, 2006. (Retrievable from PAIR).

United States Office Action dated Dec. 30, 2008, U.S. Appl. No. 11/549,461.

Office Action Response dated Apr. 30, 2009, U.S. Appl. No. 11/549,461.

United States Final Office Action dated Jul. 30, 2009, U.S. Appl. No. 11/549,461.

* cited by examiner

BATTERY PACK AUTHENTICATION FOR A MOBILE DEVICE

REFERENCE TO RELATED APPLICATION

This application claims priority from U.S. Provisional Patent Application Ser. No. 60/726,164 filed on Oct. 14, 2005.

FIELD

The embodiments described herein relate to a mobile device having a smart battery.

BACKGROUND

Peripheral devices, such as mobile wireless devices or personal data assistants, can be powered by internal means, such as an internal battery pack. The internal battery pack is an assembly of one or more batteries and provides a certain charge capacity. Different battery packs have different charge capacities, different termination voltages such as 4.2 V and 4.4 V, for example, as well as different charging/discharging characteristics. Typically, a battery pack has a battery ID resistor that indicates the battery type from which the charge capacity of the battery pack can be ascertained.

The charge capacity and the battery type are important for several reasons. For instance, if the battery is rechargeable, it is important to charge the battery to the proper charge capacity and at the proper rate. If the battery is overcharged, the battery and the mobile device in which it is used can both become damaged. This situation is becoming increasingly more likely due to the increased number of counterfeit batteries that are on the market. For battery packs with battery ID resistors, it is simple to read the resistance value of the battery ID resistor and manufacture a counterfeit battery pack with another resistor that has the same resistance value. However, the counterfeit batteries, as well as some third party non-authorized batteries, generally do not have the charge capacity of an authentic battery, may not have the required safety protection circuitry, and may not be compatible with the charging method being employed by the mobile device and therefore could possibly suffer catastrophic failure during charging, or through normal usage.

One way to deal with counterfeit battery packs may be to use "smart batteries" which include an embedded microprocessor that can be used to provide security capabilities.

In addition, the mobile wireless device usually maintains information for the different battery packs that can be used. For instance, the mobile wireless device can maintain information on the charging/discharging characteristics of various battery packs. This information may be in the form of a look-up table (LUT) that provides charge capacity versus voltage information. The information in the LUT can be used by the mobile wireless device to calculate and display battery charge capacity information to a user of the mobile wireless device. However, once a mobile wireless device is released into the market, it is difficult to maintain compatibility between the mobile wireless device and new batteries since the battery information stored on the mobile wireless device will be out of date for these new batteries. Each battery type has unique characteristics that are required knowledge for battery monitoring software. The battery monitoring software that ships with the mobile wireless device needs to be able to differentiate between different battery packs, so that the battery pack can be charged according to the maximum charge rate, as well as use battery curves that are specific to the type of battery pack. This is necessary so that the battery that ships with the device can be changed, and so that a user can change their battery in the future without incurring any problems. The data updating can be done through a software upgrade, but users find it inconvenient to update their mobile wireless device.

BRIEF DESCRIPTION OF THE DRAWINGS

For a better understanding of the embodiments described herein and to show more clearly how they may be carried into effect, reference will now be made, by way of example only, to the accompanying drawings which show the exemplary embodiments and in which:

FIG. 3 is a block diagram of an exemplary embodiment of a node of a wireless network that the mobile communication device of FIG. 1 may communicate with;

Figure 1:
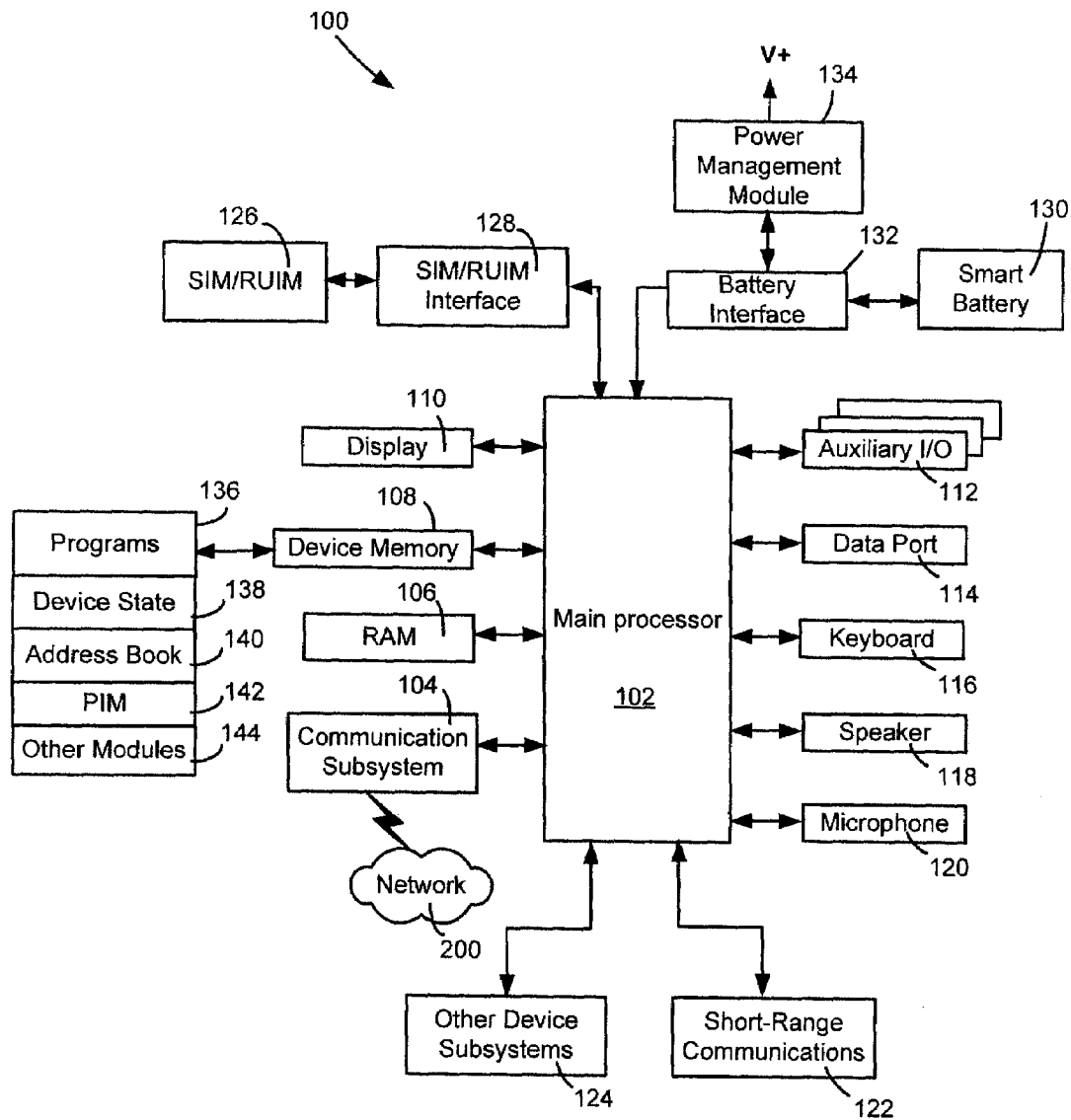
FIG. 1 is a block diagram of an exemplary embodiment of a mobile communication device.

These and other features of the exemplary embodiments are described in more detail below.

DESCRIPTION

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein. Further, the term battery pack refers to a battery pack having one or more batteries or cells.

The embodiments described herein generally have applicability in the field of data communication for mobile communication devices that use a "smart battery" which is a battery that includes a battery processor and other related circuitry to allow the smart battery to communicate with the mobile device. Various types of information can be communicated between the battery processor and the processor of the mobile device. To facilitate an understanding, the embodiments provided herein will be described in terms of a mobile wireless communication device that has a main processor, a battery interface and a smart battery having a battery processor and related electronics as will be described in more detail. However, it should be understood that the structure and functionality of the embodiments described herein can also be applied to a battery charger that charges a smart battery.

The embodiments generally make use of a mobile communication device, hereafter referred to as a mobile device, that is a two-way communication device with advanced data communication capabilities having the capability to communicate in a wireless or wired fashion with other computing devices including other mobile communication devices. The mobile device can communicate with other devices through a network of transceiver stations. The mobile device may also include the capability for voice communications. However, depending on the functionality provided by the mobile device and the structure of the mobile device, it may be referred to as a data messaging device, a cellular telephone with data messaging capabilities, a wireless organizer, a wireless Internet appliance, a personal digital assistant, a smart phone, a handheld wireless communication device (with or without telephony capabilities), a wirelessly enabled notebook computer and the like.

Referring first to FIG. 1, shown therein is a block diagram of a mobile device 100 in one exemplary implementation. The mobile device 100 comprises a number of components, the controlling component being a main processor 102 which controls the overall operation of mobile device 100. Communication functions, including data and voice communications, are performed through a communication subsystem 104. The communication subsystem 104 receives messages from and sends messages to a wireless network 200. In some implementations of the mobile device 100, the communication subsystem 104 is configured in accordance with the Global System for Mobile Communication (GSM) and General Packet Radio Services (GPRS) standards. The GSM/GPRS wireless network is used worldwide. Other standards that can be used include the Enhanced Data GSM Environment (EDGE), Universal Mobile Telecommunications Service (UMTS), Code Division Multiple Access (CDMA), and Intelligent Digital Enhanced Network (iDEN™) standards. New standards are still being defined, but it is believed that they will have similarities to the network behavior described herein, and it will be understood by persons skilled in the art that the embodiments described herein can use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with the mobile device 100 is a GSM/GPRS wireless network in some implementations, other wireless networks can also be associated with the mobile device 100 in other implementations. The different types of wireless networks that can be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, iDEN networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 102 also interacts with additional subsystems such as a Random Access Memory (RAM) 106, a device memory 108, a display 110, an auxiliary input/output (I/O) subsystem 112, a data port 114, a keyboard 116, a speaker 118, a microphone 120, short-range communications subsystem 122, and other device subsystems 124.

Some of the subsystems of the mobile device 100 perform communication-related functions, whereas other subsystems can provide "resident" or on-device functions. By way of example, the display 110 and the keyboard 116 can be used for both communication-related functions, such as entering a text message for transmission over the network 200, and device-resident functions such as a calculator or task list. Operating system software used by the main processor 102 is typically stored in a persistent store such as the device memory 108, which can alternatively be a read-only memory (ROM) or similar storage element (not shown). In some cases the device memory 108 can be flash memory. Those skilled in the art will appreciate that the operating system, specific device applications, or parts thereof, can be temporarily loaded into a volatile store such as the RAM 106.

The mobile device 100 can send and receive communication signals over the wireless network 200 after required network registration or activation procedures have been completed. Network access is associated with a subscriber or user of the mobile device 100. To identify a subscriber, the mobile device 100 may require a SIM/RUIM card 126 (i.e. Subscriber Identity Module or a Removable User Identity Module) to be inserted into a SIM/RUIM interface 128 in order to communicate with a network. Accordingly, the SIM card/RUIM 126 and the SIM/RUIM interface 128 are entirely optional.

The SIM card or RUIM 126 is one type of a conventional "smart card" that can be used to identify a subscriber of the mobile device 100 and to personalize the mobile device 100, among other things. Without the SIM card 126, the mobile device 100 is not fully operational for communication with the wireless network 200. By inserting the SIM card/RUIM 126 into the SIM/RUIM interface 128, a subscriber can access all subscribed services. Services can include: web browsing and messaging such as e-mail, voice mail, Short Message Service (SMS), and Multimedia Messaging Services (MMS). More advanced services can include: point of sale, field service and sales force automation. The SIM card/RUIM 126 includes a processor and memory for storing information. Once the SIM card/RUIM 126 is inserted into the SIM/RUIM interface 128, it is coupled to the main processor 102. In order to identify the subscriber, the SIM card/RUIM 126 contains some user parameters such as an International Mobile Subscriber Identity (IMSI). An advantage of using the SIM card/RUIM 126 is that a subscriber is not necessarily bound by any single physical mobile device. The SIM card/RUIM 126 may store additional subscriber information for a mobile device as well, including datebook (or calendar) information and recent call information. Alternatively, user identification information can also be programmed into the device memory 108.

The mobile device 100 is a battery-powered device and can include a battery interface 132 for interfacing with a smart battery 130. In this case, the battery interface 132 is also coupled to a power management module 134, which assists the battery 130 in providing power to the mobile device 100. The main processor 102 can also be coupled to the power management module 134 for sharing information. However, in alternative embodiments, the battery interface 132 can be provided by the smart battery 130; both of these components are described in further detail below.

The main processor 102, in addition to its operating system functions, enables execution of software applications 136 on the mobile device 100. The subset of software applications 136 that control basic device operations, including data and voice communication applications, will normally be installed on the mobile device 100 during its manufacture. The software applications 136 can include an email program, a web browser, an attachment viewer, and the like.

The mobile device 100 further includes a device state module 138, an address book 140, a Personal Information Manager (PIM) 142, and other modules 144. The device state module 138 can provide persistence, i.e. the device state module 138 ensures that important device data is stored in persistent memory, such as the device memory 108, so that the data is not lost when the mobile device 100 is turned off or loses power. The address book 140 can provide information for a list of contacts for the user. For a given contact in the address book, the information can include the name, phone number, work address and email address of the contact, among other information. The other modules 144 can include a configuration module (not shown) as well as other modules that can be used in conjunction with the SIM/RUIM interface 128.

The PIM 142 has functionality for organizing and managing data items of interest to a subscriber, such as, but not limited to, e-mail, calendar events, voice mails, appointments, and task items. A PIM application has the ability to send and receive data items via the wireless network 200. PIM data items may be seamlessly integrated, synchronized, and updated via the wireless network 200 with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

Additional applications can also be loaded onto the mobile device 100 through at least one of the wireless network 200, the auxiliary I/O subsystem 112, the data port 114, the short-range communications subsystem 122, or any other suitable device subsystem 124. This flexibility in application installation increases the functionality of the mobile device 100 and can provide enhanced on-device functions, communication-related functions, or both. For example, secure communication applications can enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path may, for example, be used to load an encryption key onto the mobile device 100 through a direct and thus reliable and trusted connection to provide secure device communication.

The data port 114 may be any suitable port that enables data communication between the mobile device 100 and another computing device. The data port may be a serial or a parallel port. In some instances, the data port 114 may be a USB port that includes data lines for data transfer and a supply line that can provide a charging current to charge the mobile device 100.

The short-range communications subsystem 122 provides for communication between the mobile device 100 and different systems or devices, without the use of the wireless network 200. For example, the subsystem 122 can include an infrared device and associated circuits and components for short-range communication. Examples of short-range communication standards include those developed by the Infrared Data Association (IrDA), Bluetooth, and the 802.11 family of standards developed by IEEE.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber can also compose data items, such as e-mail messages, for example, using the keyboard 116 in conjunction with the display 110 and possibly the auxiliary I/O subsystem 112. The auxiliary subsystem 112 can include devices such as: a touch screen, mouse, track ball, infrared fingerprint detector, or a roller wheel with dynamic button pressing capability. The keyboard 116 is preferably an alphanumeric keyboard and/or telephone-type keypad. However, other types of keyboards can also be used. A composed item can be transmitted over the wireless network 200 through the communication subsystem 104.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, can also be implemented on the mobile device 100. Although voice or audio signal output is accomplished primarily through the speaker 118, the display 110 can also be used to provide additional information such as the identity of a calling party, duration of a voice call, or other voice call related information.

Figure 2:
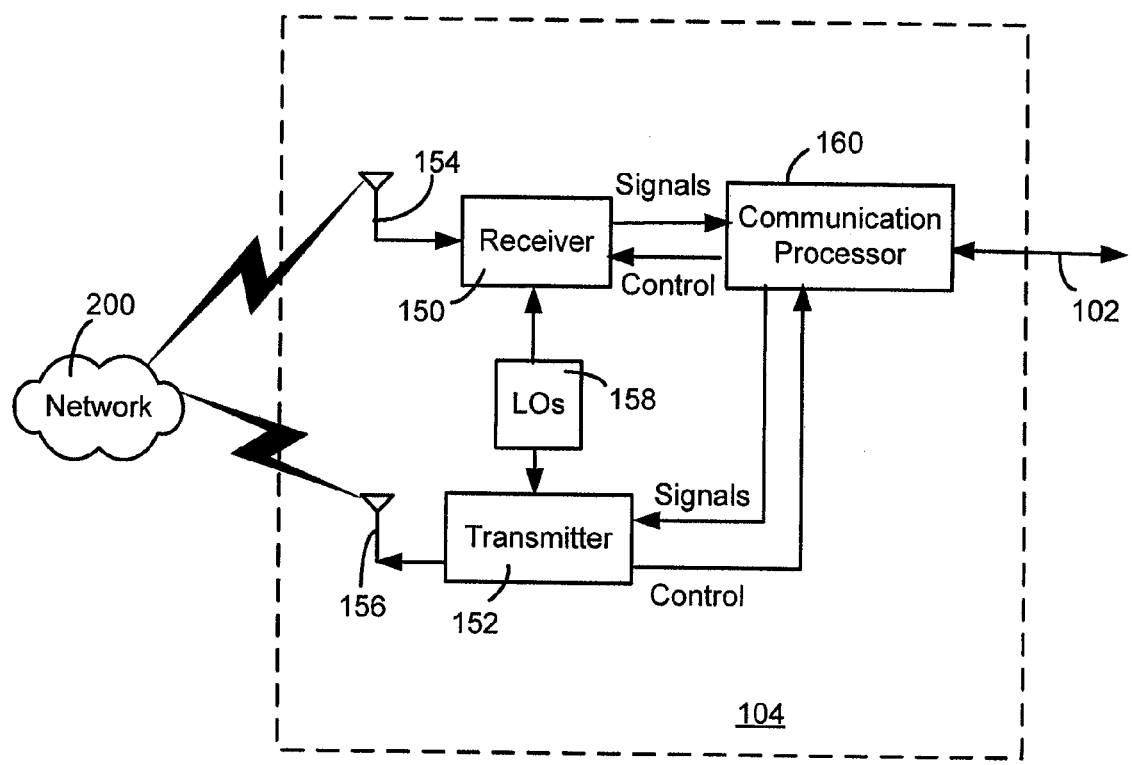
FIG. 2 is a block diagram of an exemplary embodiment of a communication subsystem component of the mobile communication device of FIG. 1.

Referring now to FIG. 2, a block diagram of an exemplary embodiment of the communication subsystem component 104 of FIG. 1 is shown. The communication subsystem 104 comprises a receiver 150 and a transmitter 152, as well as associated components such as one or more embedded or internal antenna elements 154, 156, Local Oscillators (LOs) 158, and a communications processor 160 for wireless communication. The communications processor 160 can be a Digital Signal Processor (DSP). As will be apparent to those skilled in the field of communications, the particular design of the communication subsystem 104 can depend on the communication network with which the mobile device 100 is intended to operate. Thus, it should be understood that the design illustrated in FIG. 2 serves only as an example.

Signals received by the antenna 154 through the wireless network 200 are input to the receiver 150, which can perform such common receiver functions as signal amplification, frequency down conversion, filtering, channel selection, and analog-to-digital (A/D) conversion. A/D conversion of a received signal allows more complex communication functions such as demodulation and decoding to be performed by the communications processor 160. In a similar manner, signals to be transmitted are processed, including modulation and encoding, by the communications processor 160. These processed signals are input to the transmitter 152 for digital-to-analog (D/A) conversion, frequency up conversion, filtering, amplification and transmission over the wireless network 200 via the antenna 156. The communications processor 160 not only processes communication signals, but also provides for receiver and transmitter control. For example, the gains applied to communication signals in the receiver 150 and transmitter 152 can be adaptively controlled through automatic gain control algorithms implemented in the communications processor 160.

The wireless link between the mobile device 100 and the wireless network 200 can contain one or more different channels, typically different RF channels, and associated protocols used between the mobile device 100 and the wireless network 200. An RF channel is a limited resource that must be conserved, typically due to limits in overall bandwidth and limited battery power of the mobile device 100.

When the mobile device 100 is fully operational, the transmitter 152 is typically keyed or turned on only when it is sending to the wireless network 200 and is otherwise turned off to conserve resources. Similarly, the receiver 150 is periodically turned off to conserve power until it is needed to receive signals or information (if at all) during designated time periods.

Figure 3:
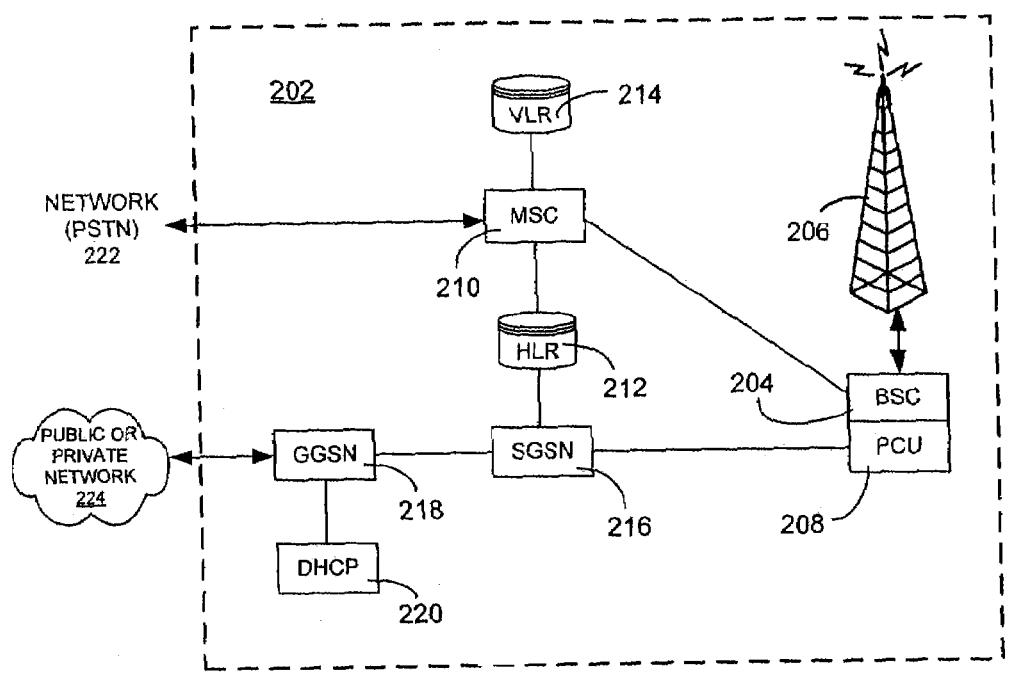

Referring now to FIG. 3, a block diagram of an exemplary embodiment of a node of the wireless network 200 is shown as 202. In practice, the wireless network 200 comprises one or more nodes 202. The mobile device 100 communicates with the node 202. In the exemplary implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that can be used in communications through the wireless network 200.

In a GSM network, the MSC 210 is coupled to the BSC 204 and to a landline network, such as a Public Switched Telephone Network (PSTN) 222 to satisfy circuit switching requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, the BSC 204 also contains a Packet Control Unit (PCU) 208 that connects to the SGSN 216 to control segmentation, radio channel allocation and to satisfy packet switched requirements. To track mobile device location and availability for both circuit switched and packet switched management, the HLR 212 is shared between the MSC 210 and the SGSN 216. Access to the VLR 214 is controlled by the MSC 210.

The station 206 is a fixed transceiver station. The station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the mobile device 100 in accordance with particular, usually predetermined, communication protocols and parameters, under control of its controller. The fixed transceiver equipment similarly demodulates and possibly decodes and decrypts, if necessary, any communication signals received from the mobile device 100 within its cell. The communication protocols and parameters may vary between different nodes. For example, one node may employ a different modulation scheme and operate at different frequencies than other nodes.

For all mobile devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time require less use of computing resources.

The SGSN 216 and GGSN 218 are elements added for GPRS support; namely packet switched data support, within GSM. The SGSN 216 and MSC 210 have similar responsibilities within the wireless network 200 by keeping track of the location of each mobile device 100. The SGSN 216 also performs security functions and access control for data traffic on the wireless network 200. The GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 to be connected to the GGSN 218. There are many mechanisms for dynamic IP assignment, including using a combination of a Remote Authentication Dial-In User Service (RADIUS) server and DHCP server. Once the GPRS Attach is complete, a logical connection is established from the mobile device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the wireless network 200, insofar as each mobile device 100 must be assigned to one or more APNs and the mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (Ipsec) connections used with Virtual Private Networks (VPN). These tunnels are also referred to as Packet Data Protocol (PDP) contexts and there are a limited number of these available in the wireless network 200. To maximize use of the PDP Contexts, the wireless network 200 will run an idle timer for each PDP Context to determine if there is a lack of activity. When the mobile device 100 is not using its PDP Context, the PDP Context can be de-allocated and the IP address returned to the IP address pool managed by the DHCP server 220.

Figure 4:
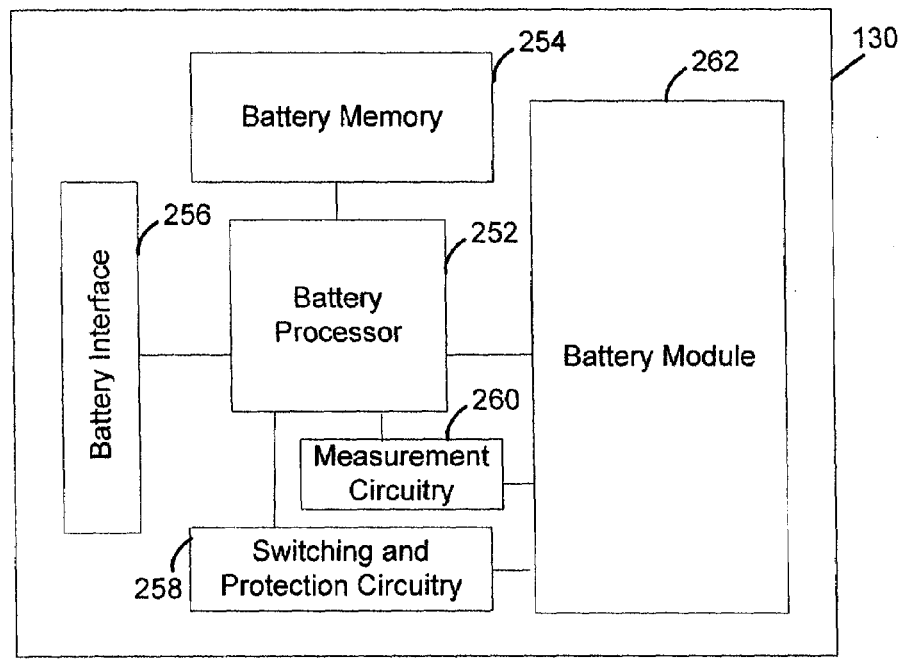
FIG. 4 is a block diagram of an exemplary embodiment of a generic smart battery that can be used in the mobile communications device of FIG. 1.

Referring now to FIG. 4, shown therein is a block diagram of an exemplary embodiment of the smart battery 130 that can be used in the mobile device 100. The smart battery 130 includes a battery processor 252, battery memory 254, a battery interface 256, switching and protection circuitry 258, measurement circuitry 260 including an analog to digital converter (not shown) and a battery module 262. The battery module 262 includes one or more batteries, which are generally rechargeable. The batteries can be made from nickel-cadmium, lithium-ion, or other suitable composite material and the like. In some implementations, the battery processor 252 can be the PIC10F202 made by Microchip of Chandler, Ariz., USA. In these cases, a single General Purpose Input/Output (GPIO) pin on the battery processor 252 can be connected to the main processor 102 to receive instructions from the main processor 102 and to provide data to the main processor 102.

The battery processor 252 controls the operation of the smart battery 130 and can communicate with the main processor 102 via the battery interface 256. The battery processor 252 includes registers, stacks, counters, a watchdog timer, and other components (all not shown) that are commonly used by a processor as is known by those skilled in the art. The battery processor 252 can also include a clock (not shown). The smart battery 130 can store information in the battery memory 254. The battery memory 254 can be a combination of volatile and non-volatile memory.

The measurement circuitry 260 can be used by the smart battery 130 to read certain data related to the operation of the battery module 262 such as battery current, battery voltage, battery temperature and the like. These measurements can be used to obtain an accurate estimate of the amount of charge capacity remaining in the battery module 262. To perform these measurements, the measurement circuitry 260 includes an analog to digital converter (ADC) (not shown). The measurement circuitry 260 can be optional, since in alternative embodiments, the mobile device 100 can include circuitry for performing the functionality of the measurement circuitry 260.

The switching and protection circuitry 258 can be used to protect the smart battery 130. The switching and protection circuitry 258 can act like a circuit breaker and can be activated by the battery processor 252 or the main processor 102 under certain situations to ensure that the smart battery 130 is not damaged in use. For instance, the switching and protection circuitry 258 can include a thermal breaker to disable the smart battery 130 when the temperature of the battery module 262 is too high. The thermal breaker can also disconnect the smart battery 130 under high current loads if other protection circuitry fails. The switching and protection circuitry 258 can also protect against short circuits, under voltage conditions, over voltage charging, reverse polarity being applied to the battery 130, etc. Accordingly, the switching and protection circuitry 258 can also be used during the charging, discharging or pre-charging of the battery module 262 as well as for battery cell balancing. Additional protection circuitry can be included in the battery interface 132.

The battery module 262 provides the supply power to the battery processor 252, which then provides the supply power to the main processor 102 via the battery interface 256, using connections commonly known by those skilled in the art, such a via a system power bus. The battery interface 256 is optional if the mobile device 100 includes the battery interface 132, which can provide the same functionality as the battery interface 256. For the remainder of this description of this exemplary embodiment, it is assumed that there is no battery interface 132, and that the smart battery 130 provides the battery interface 256, although in other embodiments, this need not be the case.

Figure 5A:
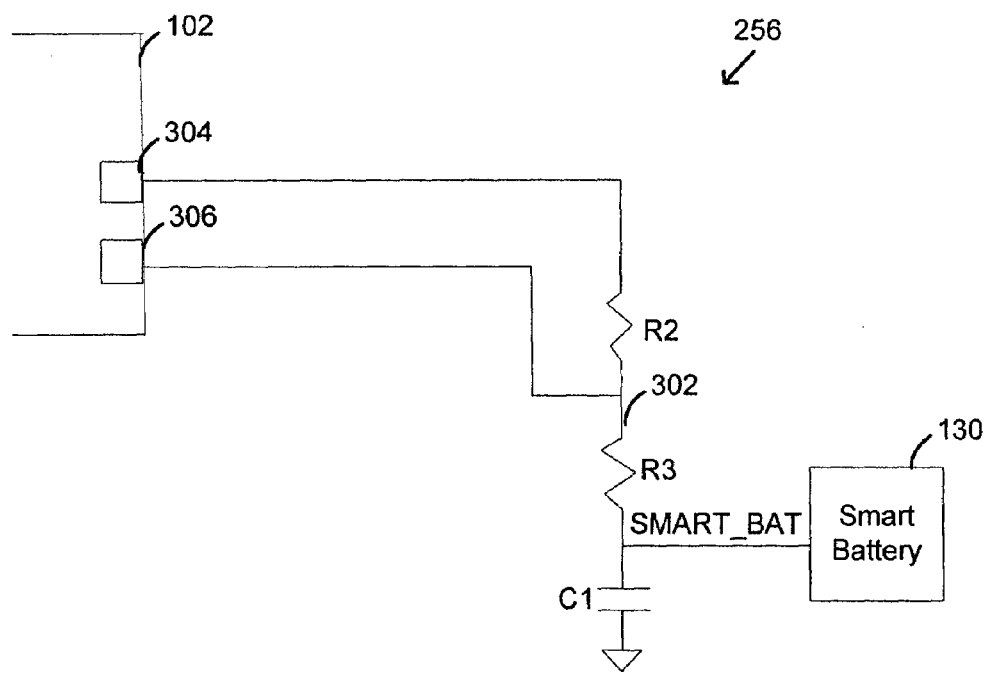
FIG. 5A is a schematic of an exemplary embodiment of a portion of a battery interface that can be used in the mobile communication device of FIG. 1 to couple the main processor to the smart battery.

Referring now to FIG. 5A, shown therein is a schematic of an exemplary embodiment of a portion of the battery interface 256 that can be used to couple the main processor 102 to the smart battery 130 (supply power connections are not shown). Conventional methods for battery identification (i.e. model, manufacturer, etc.) only use a battery identification resistor in the conventional battery pack with an associated battery ID data line. Correspondingly, the battery interface 256 couples the main processor 102 with the battery data line SMART_BAT of the smart battery 130 via a single communication line 302. The SMART_BAT data line is connected to an input/output pin on the smart battery 130. However, the smart battery 130 is configured to communicate with host processors that work with a battery pack having a battery ID resistor, or a smart battery as is described in more detail below.

Since the battery interface 256 includes the single communication line 302 for communication between the main processor 102 and the battery processor 252, and since the main processor 102 transmits data to and receives data from the battery processor 252, the communication line 302 can be configured as a half-duplex communication line. The use of a half-duplex communication line reduces the need for more communication lines between the main processor 102 and the battery processor 252.

During operation, at a given moment in time, data flows in one direction for a half-duplex communication line. Accordingly, the communication line 302 is connected to both transmit and receive pins 304 and 306 on the main processor 102. In some cases, the transmit and receive pins 304 and 306 on the main processor 102 can be implemented with UART transmit and receive ports/pins. The main processor 102 uses the UART interface as they are normally used, but ignores the receiver pin 306 during transmission on the transmit pin 304.

Further, the use of half-duplex communication requires that only one of the main processor 102 and the battery processor 252 communicate at a given point in time. This can be accomplished by defining one of the processors 102 and 252 as a master and the other as a slave. Generally, the main processor 102 is the master and the battery processor 252 is the slave.

In some implementations, the smart battery 130 automatically operates in the lowest possible power state to conserve energy. This is also done since there may not always be a main processor connected to the smart battery 130 to instruct the smart battery 130 to enter into sleep mode. To address these issues, in some implementations, low power consumption and reliability can be obtained by using the watchdog timer of the battery processor 252 as a total system reset/sleep mechanism. However, the watchdog count-down timer should not be reset since it is possible that a coding error could lead to the clear watchdog timer instruction being called in a loop. When the watchdog counter hits zero, the mobile device 100 is reset and the mobile device 100 restarts. However, if an operation has to be performed that takes longer than the watchdog timer/counter, then the watchdog timer can be reset at least once to ensure that the operation runs to completion and the mobile device 100 does not restart.

The battery interface 256 also includes protection circuitry for protecting the main processor 102 from ElectroStatic Discharge (ESD) on the communication line 302. In some implementations, the protection circuitry can be an RC network. In the exemplary embodiment of FIG. 5A, the RC network for providing ESD protection includes resistor R3 and capacitor C1. Resistor R2 can be used as a pull-up resistor. A first node of the resistor R2 is connected to the transmit pin 304 and a second node of the resistor R2 is connected to the receive pin 306. A first node of the resistor R3 is connected to the second node of resistor R2 and a second node of the resistor R3 is connected to a first node of the capacitor C1. A second node of the capacitor C1 is connected to ground. In an exemplary implementation, the resistor R2 can have a resistance of 1 kΩ, the resistor R3 can have a resistance of 150Ω and the capacitor C1 can have a capacitance of 15 pF. The value of the resistor R2 depends on the ESD network selected for the battery data line (which is discussed further below). The resistor R2 can act as a pull-up resistor when the main processor 102 is operating in receive mode. In this exemplary embodiment, the output voltage on the transmit pin 304 can be 2.8 V or 2.6 V depending on the communication chipset used by the mobile device 100. For CDMA chipsets, 2.6 V can be used.

The use of an RC network for the protection circuitry slows down the data rate on the communication line 302. For this exemplary implementation, the data rate has a maximum rate of approximately 300 bits per second. However, the limit of 300 bits per second for the data rate can be beneficial from a security point of view since, for a lower data rate, it will take a third party longer to "hack" any security algorithms that are stored on the smart battery 130. In some embodiments, if a cryptographic algorithm (i.e. a cryptographic method) is executed by the battery processor 252, the computational complexity of the cryptographic algorithm can be adjusted so that the algorithm takes longer to execute which can also deter hacking.

In some cases, the battery processor 252 can be configured to act as an open drain device and a pull-up resistor can be used with the main processor 102. This is because the Vcc voltage level, and hence the output drive voltage on the battery processor 252, may exceed the rated voltage of the transmit and receive pins 304 and 306 of the main processor 102. This can occur if the battery processor 252 is driving a high output signal as opposed to turning on a tri-state buffer (i.e. acting as an open drain). The pull-up resistor (i.e. resistor R2) can be placed between the transmit and receive pins of the main processor 102 because the transmit line 304 idles in a high state.

Alternatively, if conventional battery packs are used, then the battery ID resistor value can be obtained by communicating over the SMART_BAT line. Accordingly, by also incorporating a battery ID resistor into the smart battery 130, the smart battery 130 is compatible with mobile devices that are manufactured to use battery packs that have battery ID resistors and with mobile devices that are manufactured to use smart batteries. It should be understood that the battery ID resistor is included within the smart battery 130 (i.e. see FIG. 5C).

To facilitate operation with different batteries having different charge capacities, maximum and minimum logic levels for voltages and currents can be defined as shown, for example, in equations 1-2 for the smart battery 130 and equations 3-4 for the main processor 102.

$$Vih = 0.25 * Vdd + 0.8 \text{ V} \tag{1}$$

$$Vil = 0.15 * Vdd \tag{2}$$

$$Vil\sim = 0.3 * (GPIO\ Vdd) \tag{3}$$

$$Vih\sim = 0.7 * (GPIO\ Vdd) \tag{4}$$

For example, considering a smart battery with a termination voltage of 4.4 V (i.e. Vdd=4.4 V), Vih(max)=1.9 V, and Vil (max)=0.66 V. Further considering a main processor that operates with a Vdd on the transmit and receive pins 304 and 306 of 2.8 V and 2.6 V (depending on the communication chipset), Vil(min)=0.78 V, and Vih(max)=1.96 V.

Figure 5B:
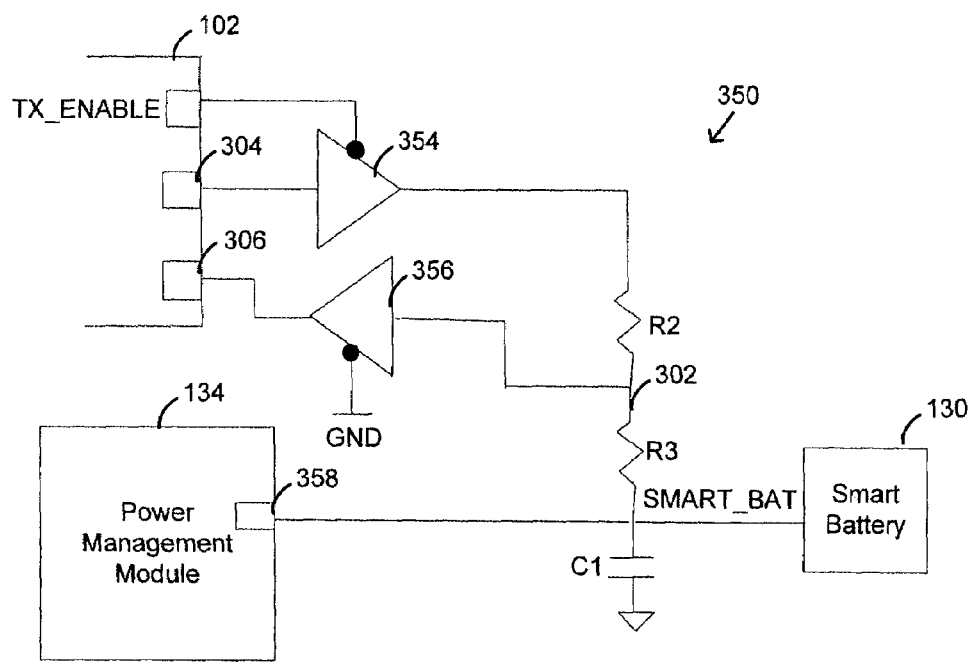
FIG. 5B is a schematic of another exemplary embodiment of a portion of a battery interface that can be used in the mobile communication device of FIG. 1 to couple the main processor to the smart battery.

Referring now to FIG. 5B, shown therein is a schematic of an exemplary embodiment of another battery interface 350 that can be used in the mobile device 100 to couple the main processor 102 to the smart battery 130. In this case, the battery interface 350 includes a similar RC network as was used in the battery interface 256, and two tri-state buffers 354 and 356. The power management module 134 is connected to the SMART_BAT battery data line of the smart battery 130 via input pin 358.

A tri-state buffer can pass a high or low logic level signal and can disconnect its input from its output depending on the value of the control input. The input node of the tri-state buffer 354 is connected to the transmit pin 304 of the main processor 252 and the output node of the tri-state buffer 354 is connected to the communication line 302 via the resistor R2. The input node of the tri-state buffer 356 is connected to the communication line 302 and the output node of the tri-state buffer 356 is connected to the receive pin 306 of the main processor 102. The main processor 102 also includes a TX_ENABLE pin for disabling and enabling the buffer 354 and is connected to the control input of the buffer 354. In this exemplary implementation, both of the tri-state buffers 354 and 356 can be enabled with a logic low signal. Further, in some implementations, the tri-state buffer 356 can always be enabled; this is described in further detail below. Accordingly, the control input of the tri-state buffer 356 can be connected to ground.

The tri-state buffers 354 and 356 can be used with the smart battery 130 when the power management module 134 detects whether the smart battery 130 has been removed. Battery removal detection is not a problem for the embodiment shown in FIG. 5A when battery packs with a battery ID resistor are used because a current, such as 10 µA, can be sourced through the battery ID resistor (not shown). The resulting voltage drop can then be measured to determine if the battery pack is still attached to the mobile device 100. Checking for battery removal occurs under various situations, one of which is when the mobile device 100 is recharging the battery.

Alternative embodiments can also be used to detect battery removal. For instance, a comparator circuit (not shown) can be connected to the SMART_BAT data line. The comparator circuit can operate independently of the main processor 102 and it can create and send a reset pulse to the main processor 102 in the event of battery removal. The comparator threshold can be lower than the 2.8/3.0 V GPIO rating so clamping is not an issue. In some embodiments, the thermistor (not shown) in the smart battery 130 can be continuously polled. This can be done with a connection that is separate from the UART pins on the main processor 102 and so the voltage clamping of the transmit and receive pins 304 and 306 are not an issue. The polling can be done by another processor other than the main processor 102.

With smart batteries, the battery ID can be stored in the battery memory 254 and the battery processor 252 can communicate this information to the main processor 102. This allows the smart battery 130 to be authenticated via software to ensure that the smart battery 130 is not a counterfeit battery. Part of the authentication process involves obtaining the battery ID whenever the smart battery 130 is inserted into the mobile device 100 or each time the mobile device 100 is turned on. Otherwise, the authentication process is not usually repeated.

However, in at least some embodiments, the smart battery 130 can store the battery ID in the battery memory 254 and can also include a battery identification (ID) resistor. This allows the smart battery 130 to be backwards compatible with mobile devices that are only looking for the battery ID resistor. The smart battery 130 is also compatible with mobile devices that communicate with the battery processor 252 to obtain the battery ID. Both battery interfaces 256 and 350 support measuring the battery ID resistor as well as communication between the main processor 102 and the battery processor 252. The components used in the battery interfaces 256 and 350 also provide ESD protection. The battery ID resistor can also be used to detect the presence of the battery 130.

The power management module 134 can independently check whether the battery 130 is still connected to the mobile device 100. This feature can be implemented using interrupts. This is typically done while the battery 130 is being charged. In some cases, to detect battery removal, the power management module 134 passes a current through the battery ID resistor and the voltage across the battery ID resistor is measured. This current can be in the order of 10 µA. The power management module 134 measures this voltage via input 358, which is connected to an analog to digital converter (not shown) in the power management module 134. During this process, the power management module 134 is directly sensing the presence of the smart battery 130 and there is no need for a connection between the power management module 134 and the main processor 102. Further, during this time, there is no need for a connection between the main processor 102 and the smart battery 130. Accordingly, in some cases, the tri-state buffer 354 can be disabled. The enabling/disabling of the buffer 354 can be done at certain times (i.e. battery insertion for example) and the current source (not shown) in the power management module 134 can be controlled in order to not interfere with battery communication.

There can be instances in which the main processor 102, the battery processor 252 and the power management module 134 can be operating at different power levels. Accordingly, the embodiment of FIG. 5B can be used to protect the main processor 102 from the higher voltage levels used by the battery processor 252 in certain situations. For example, if the smart battery 130 is removed, the voltage on the SMART_BAT data line increases above a threshold that is greater than 4 V. If battery removal occurs while the smart battery 130 is being charged, then the mobile device 100 can be configured to reset and reboot. However, the transmit and receive pins 304 and 306 may not be able to accommodate such high voltages since, in some implementations, the transmit and receive pins 304 and 306 may only be rated for input/output voltages of 3.0/2.8 V respectively and will clamp any input voltage to 3.0/2.8 V instead of passing a voltage greater than 4 V that is typically used by the power management module 134 for battery removal detection. Particular implementations of the buffers 354 and 356 can be selected and provided with enable/disable control signals to aid in resolving the voltage compatibility issues between the main processor 102, the battery processor 252 and the power management module 134.

Figure 5C:
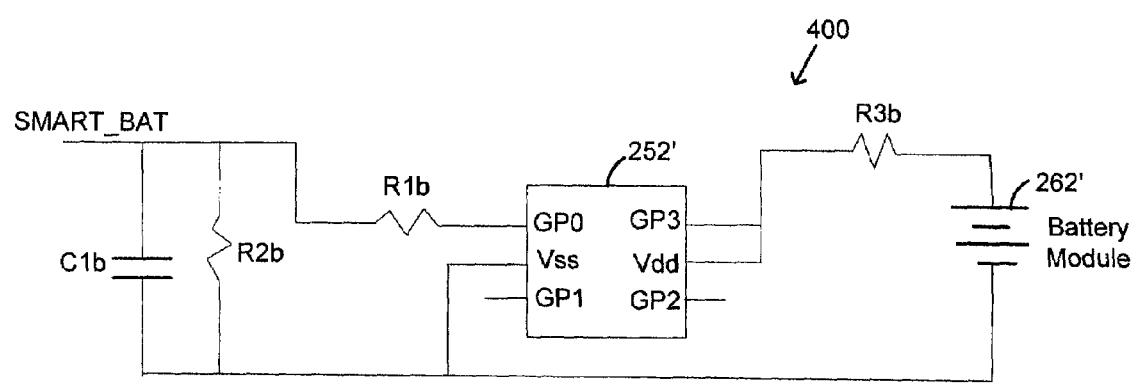
FIG. 5C is a schematic of a portion of another exemplary embodiment of a smart battery.

Referring now to FIG. 5C, shown therein is a schematic of a portion of another exemplary embodiment of a smart battery 400. In general, in at least some of the embodiments shown herein, the battery processor 252' can be the PIC10F202 microprocessor. The battery processor 252' includes general-purpose pins GP0, GP1, GP2, GP3, and power supply pins Vdd and Vss. The smart battery 400 includes resistors R1$b$, R2$b$, R2$b$, and capacitor C1$b$. The resistors R1$b$, R2$b$ and the capacitor C1$b$ can be part of the battery interface 256. In some cases, the battery module 262' can have a termination voltage of 4.2 V or 4.4 V.

The SMART_BAT data line is connected to the input GP0 of the battery processor 252' through resistor R1$b$. The resistor R2$b$ can be used as the battery ID resistor which allows for backwards compatibility with mobile devices that can not communicate with the battery processor 252' as well as for other uses. The battery ID resistor R2$b$ can have several different resistance values such as, for example, 100 kΩ, 86.6 kΩ and 15 kΩ, to indicate the charge capacity of the battery module 262'.

The capacitor C1$b$ and the resistor R1$b$ provide ESD protection for the input pin GP0. Further ESD protection on the input pin GP0 can be provided by connecting a diode array (not shown) such as, for example, the SMF05 made by SEMTECH of Camarillo, Calif., USA. The resistor R3$b$ also provides ESD protection for the GP3 pin. The smart battery 400 can also include standard lithium-ion cell protection circuitry (not shown). In one exemplary implementation, the resistor R1$b$ can have a resistance of 100Ω, the resistor R2$b$ can have a resistance of 100 kΩ, 86.6 kΩ or 15 kΩ, the resistor R3 can have a resistance of 100Ω, and the capacitor C1$b$ can have a capacitance of 0.1 µF.

The battery processor 252' can directly read high logic level signals (i.e. a logic level of '1' at 2.8 V for example) and low logic level signals (i.e. a logic level of '0' at 0 V for example) via the GP0 pin. To write a '0', the GP0 pin, which is a general-purpose input/output pin, is configured as an output pin and driven low. To write a '1', the GP0 pin is configured as an input pin and is pulled high by the main processor 102 (via the resistor R2). In some cases, the battery processor 252' does not drive a '1' since this can damage the hardware of the main processor 102.

Counterfeit battery packs are becoming more prevalent and are problematic since these battery packs may not have as much capacity as an authentic battery pack. This can lead to various problems, which includes damaging the mobile device 100 when a counterfeit battery pack is being charged. Accordingly, the battery processor 252 of the smart battery 130 can execute an encryption or cryptographic algorithm that allows the main processor 102 to authenticate the smart battery 130 to ensure that it is not a counterfeit battery or a battery pack that is not authorized for use with the mobile device 100 (this may be due to the non-authorized battery pack not having sufficient charge capacity, sufficient protection circuitry, different charging characteristics and the like).

Typically, current smart batteries employ symmetric key cryptography for authentication with a mobile device based on a private key. This means that conventional smart batteries and conventional mobile devices both contain the private key. Smart batteries can be custom designed to protect information stored on the battery hardware. However, there is no analogous hardware protection for mobile devices. Mobile devices typically use off-the-shelf components, and thus the private key is typically held in a regular flash memory chip. The contents of the flash chip can be recovered, perhaps via JTAG emulation and debugging or by removing the chip from the printed circuit board, and then the private key can be recovered. Once this private authentication key is recovered, then counterfeit batteries may be manufactured with the private key information. Accordingly, from a security point of view, the counterfeit smart battery now has the same security information as an authentic smart battery, and thus the mobile device 100 cannot discriminate between the two batteries.

To address this issue, the following security protocol can be used. The main processor 102 can send a challenge message to the smart battery 130. The challenge message can be a random number. The battery processor 252 takes the challenge message and produces a response message by using a cryptographic algorithm, the challenge message and a private key. Any suitable cryptographic algorithm can be used that is feasible for execution on the smart battery 130 and for which it is reasonably computationally infeasible for a hacker to determine the private key. The main processor 102 then compares the response message with a reference message stored in the mobile device 100. If there is a match, this indicates that the smart battery 130 knows the private key. The smart battery 130 is then verified as an authentic battery that is safe and is qualified for use. However, counterfeit batteries will generally not know the private key.

The private key is not stored in the device memory 108 of the mobile device 100 because in some cases the mobile device 100 is not secure. However, the battery memory 254 of the smart battery 130 is secure and the private key is stored in the battery memory 254. Further, several challenge and response pairs can be stored on the mobile device 100 and any one of them can be used to authenticate the battery pack. In some implementations, the challenge and response pairs can be stored in the NVRam of the mobile device 100.

For an additional level of security, each mobile device 100 can be programmed with a unique challenge and response pair. This ensures that if a third party intercepts the challenge and response pair for a given mobile device, the third party only obtains challenge and response information generated for that particular mobile device. Other mobile devices will use a different challenge and response pair. Accordingly, even if the challenge and response information is copied for one mobile device and incorporated into a counterfeit battery, the counterfeit battery can only be used with that particular mobile device and will not work with other mobile devices. Therefore, in order for a counterfeiter to succeed in producing counterfeit batteries that appear to be authentic, the counterfeiter would have to obtain the cryptographic algorithm and the private key.

Accordingly, during the manufacture of a given mobile device, one or more unique challenges can be generated, and the corresponding responses calculated for a given private key. The challenge and response pairs are then stored on the given mobile device and the given private key is stored on the smart battery that is to be used with the given mobile device. In some embodiments, the smart batteries of a given form factor can be given the same private key. This allows the smart batteries to be interchangeable with one another for a given mobile device. Accordingly, a smart battery can be replaced for a given mobile device if the smart battery is lost or damaged.

Conventional battery packs have a battery ID resistor that can be sensed by the main processor 102 to determine what type of battery pack has been connected to the mobile device 100. The mobile device 100 can store battery information profiles for several different types of batteries that can be used with the mobile device 100. The battery information profiles are typically stored in the memory 106. The mobile device 100 uses the particular battery information profile that corresponds to the battery pack that is inserted into the mobile device 100. The battery information includes information related to charging curves, discharging curves and the like. The curves are plots of voltage versus charge capacity and can be stored in lookup tables (LUT). Interpolation can be used on the LUT.

The voltage vs. charge capacity curves are useful since different battery packs can be charged at different rates. For instance, certain battery packs can accommodate a charging current of 750 mA, while others can accommodate a charging current of 1.5 A. The curves can also change depending on the operation of the mobile device 100. For instance, the communication standard used by the mobile device 100 for wireless communication has an effect on the rate and amount of discharge of the battery packs. For instance, different discharge curves apply to the same battery pack depending on whether the mobile device 100 is using the CDMA communication standard or the GPRS communication standard. Alternatively, rather than storing two battery information profiles, which include voltage vs. charge capacity curves, for two different communication standards, a battery information profile for a first voltage vs. charge capacity curve can be stored and another battery information profile that includes a set of offsets can be stored to derive the other curve from the first curve.

In another alternative, rather than store different battery information profiles for mobile devices that operate differently, due to the communication standard used for example, a universal battery information profile can be used. The mobile device 100 can then be configured to read the information from the universal battery information profile but perform different calculations to obtain the necessary battery related information such as the battery charging curve for example. For instance, once again using the GSM and CDMA communication standards as an example, for CDMA radios, current will be drawn generally at constant rate, whereas for GSM radios, there will be several spikes in the drawn current. In this case, for each battery information profile for each battery type, a charging curve can be generated based on a first condition to emulate current usage by a first radio. Load condition information can then be noted for the differences in current usage by the other radios with respect to the first radio. This load condition information can be stored on the mobile device 100 or the smart battery 130. Accordingly, when the battery information profile is read by the mobile device 100, additional calculations can be made by the mobile device 100 based on the load condition information if the mobile device 100 uses one of the "other radios".

In some embodiments of the mobile device 100, rather than, or in addition to, storing the battery information profiles on the mobile device 100, the battery information profiles can be stored in the battery memory 254 of the smart battery 130. Accordingly, when a new smart battery is released, rather than having to update the battery information profiles on the mobile device 100, the battery information profile is already contained in the smart battery 130. The main processor 102 can access the battery information profile stored on the smart battery to determine battery charging/discharging characteristics every time a different smart battery, a new smart battery, or a smart battery of a new battery supplier is used. The mobile device 100 can then store the new battery information profile in the memory 106. The battery information profile is accessed according to a battery communication protocol that is described in more detail below.

Accordingly, in some embodiments, battery information profiles can be stored in the mobile device 100 for a given smart battery 130 and the given smart battery 130 can also store additional battery information profiles in the battery memory 254. In some cases, a rule of thumb that can be followed is that if a particular battery information profile exists in both the smart battery 130 and the mobile device 100, then the battery information profile stored in the smart battery 130 supercedes the battery information profile stored on the mobile device 100. However, other rules of thumb can also be applied. For instance, since the battery information profile in the smart battery 130 can be revision controlled and the corresponding version number can be read by the mobile device 100, the mobile device 100 can be provided with version information of a version number that corresponds to the release of battery information that is erroneous and should not be used. In this case, the mobile device 100 can use the battery information profile associated with a version number that has been identified as being correct; this battery information profile may already be stored on the mobile device 100.

In addition, in at least some embodiments, rather than using a battery ID resistor, or sourcing the battery ID resistor, the battery ID can also be stored in the battery memory 254. The main processor 102 then communicates with the smart battery 130 over the communications line 302 to obtain the battery ID information rather than relying on the use of a battery ID resistor. The battery ID information can be accessed according to a battery communication protocol that is described in more detail below. Accordingly, extra circuitry is not required for reading the battery ID resistor. This reduces circuit complexity and cost. The battery ID depends on the type of smart battery and can be used to identify the smart battery according to model, manufacturer, chemistry etc. In some embodiments, battery discharge/charging information can be stored on the mobile device for several batteries, and once the battery ID is determined, the main processor 102 can use this ID information to select the corresponding battery profile information such as battery discharge/charging information for battery charging and monitoring. In this sense, the mobile device 100 can support multiple batteries.

There may also be some embodiments in which an interface is provided between the main processor 102 and the smart battery 130 such that the mobile device is compatible with a conventional battery pack that uses only a battery ID resistor and with a smart battery that stores the battery ID information in the battery memory 254. In these cases, the device can assume that it is connected to a smart battery and try to communicate accordingly. If this communication fails, then the conventional method of reading the battery ID resistor can be used.

In order for the main processor 102 to communicate with the battery processor 252, a battery communication protocol is used. The logic levels that are used for data communication depend on the implementation of the main processor 102 and the battery processor 252. For example, in some implementations, a high logic level (i.e. a '1') can be represented by approximately a 2.8 V line level and a low logic level (i.e. a '0') can be represented by approximately 0 V. Due to the use of ESD protection circuitry, the communication line 302 can be limited to a data rate, such as approximately 300 bps, for example, which provides a 3.33 ms bit time. Data can be transmitted by leading with one start bit, followed by several 8-bit data segments (in which the LSB is transmitted first), followed by at least one stop bit. In some implementations, the start bit can be a '0' and the stop bit can be a '1'.

In some implementations, the communication line idles at the high logic level (driven by the transmit pin 304 of the main processor 102) while a session is active. When the session is inactive, the main processor 102 can configure the communication line 302 to operate in an inactive/low-power state. Accordingly, in some implementations, the transmit and receive pins 304 and 306 can be driven low.

Since the communication line 302 is a half-duplex line, only the main processor 102 or the battery processor 252 can transmit data at a given point in time. Accordingly, there can be a master/slave relationship between the main processor 102 and the battery processor 252 in which the battery processor 252 is allowed to transmit only in response to a command from the main processor 102. The main processor 102 can transmit at any time, except while waiting for a response from the battery processor 252. The battery processor 252 can begin transmitting a response within a given amount of time after receiving an end of packet marker (END) from the main processor 102. Further, the main processor 102 can wait for a certain amount of time for a response from the smart battery 130 before resending the original request.

The data link between the main processor 102 and the battery processor 252 can be implemented using the RC 1055 implementation. To avoid having the main processor 102 and the battery processor 252 transmit at the same time, the "leading stop character" optimization is not used. Rather, the Data Link layer attempts to provide a packet-based interface on top of the serial byte-stream provided by the physical communication layer. It does this by "framing" each packet (i.e. making the end of each packet easily found within the byte stream) with a unique character such as "0xC0". Accordingly all incoming bytes are stored until the character "0xC0" is read. The stored data is then passed up to the next layer.

However, the character "0xC0" may be sent as data, so one should ensure that the character "0xC0" is unique and used only to mark the end of a frame. One way to do this is to replace any instance of the character "0xC0" in the data with two characters: such as "0xDB" and "0xDD" for example. If it is desired to send the character "0xDB" in the data, then, in a similar way, the character "0xDB" is replaced with the characters "0xDB" and "0xDC" for example.

In terms of receiving data, for this exemplary embodiment, when the character "0xC0" is encountered then data transmission is finished. If the character "0xDB" is encountered, the fact that something special has to be done on the next character is recorded, and every other character is stored in a buffer. Now, in this example if the character was "0xDB", when the next character arrives one of three things can be done: 1) if the next character is "0xDD", then the character "0xC0" is stored in the buffer, 2) if the next character is "0xDC", then the character "0xDB" is stored in the buffer, or 3) if the next character is anything else, then an error occurred, which can be handled by the next layer.

As stated earlier, the battery processor 252 will nearly always be in sleep mode to reduce power consumption. Upon receiving a START bit from the main processor 102, the battery processor 252 will wake and accept incoming data until either an END character is received or the watchdog timer expires (for example, the watchdog timer can expire after approximately 2.3 s). Therefore, the main processor 102 attempts to transmit each request packet before the watchdog timer expires. Accordingly, the main processor 102 can attempt to transmit each request packet with the smallest possible inter-byte delay.

Figure 6A:
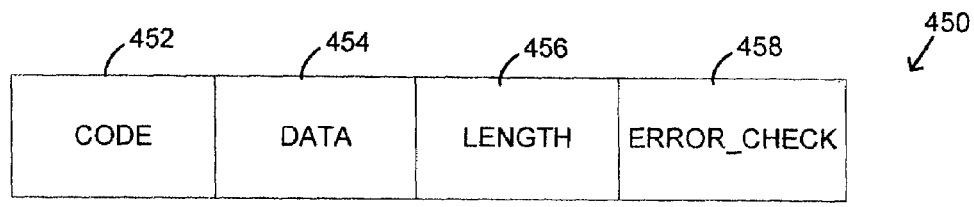
FIG. 6A is a block diagram of an exemplary embodiment of a general structure for a packet that can be used for communication between the main processor and the battery processor of the mobile communications device of FIG. 1.

Referring now to FIG. 6A, shown therein is a block diagram of an exemplary embodiment of a general structure for a packet 450 that can be used for communication between the main processor 102 and the battery processor 252. The data bits in the packets can be transmitted from left to right and multi-byte data elements can be transmitted in a Least Significant Bit (LSB) (little endian) fashion. The packet 450 includes a CODE field 452, a DATA field 454, a LENGTH field 456 and an ERROR_CHECK field 458. Multi-byte data is simply any number that requires more than 8 bits (one character) to store in memory. For example, consider the number 0x12345678, which requires 4 characters. When these characters are transmitted, they are sent in an LSB fashion with the LSB first. That is, first 0x78 is sent, followed by 0x56, 0x34, and finally 0x12.

The CODE field 452 identifies the type of packet (i.e. whether information is being provided or requested). When a packet is received with an unknown CODE field 452, a protocol version response packet is transmitted by the battery processor 252. This response packet can also be transmitted by the battery processor 252 any time a packet is transmitted by the main processor 102 that has an incorrect length, error checking field value, etc. In some implementations, the CODE field 452 includes codes for specifying a protocol version request, a protocol version response, a battery authentication challenge, a battery authentication response, a battery information request and a battery information response. In some implementations, the CODE field 452 can include one byte.

The DATA field 454 includes data that depends on the specific request or response that is being made. The DATA field 454 can include as many bytes as required to transmit data, however there can be a limit. In some embodiments, the LENGTH field 456 can contain numbers from 0-255. Since the CODE, LENGTH and ERROR_CHECK fields are all included in the length, the entire packet 450 can be a maximum of 255 characters and the DATA field 454 can be a maximum of 252 characters. Examples of different types of data are discussed below.

The LENGTH field 456 defines the number of bytes in the packet, including those in the CODE field 452, DATA field 454, LENGTH field 456 and ERROR_CHECK field 458. SLIP framing is generally not considered because it is generally not known how long the SLIP frame will be. Some characters may be doubled from one character to two, and it is not certain which or how many will be doubled. In some implementations, the LENGTH field 456 includes one byte.

The ERROR_CHECK field 458 provides data that can be used to verify that data has been correctly received at the main processor 102 or the battery processor 252. Various types of communication error-checking schemes can be used depending on the processing power of the battery processor 252. In some implementations, a CheckSum value is used. The CheckSum value is an unsigned 8-bit value such that the sum of the data contained in the CODE through CheckSum fields modulus 256 is equal to 0. In some implementations, when using CheckSum, the ERROR_CHECK field 458 includes one byte.

Figure 6B:
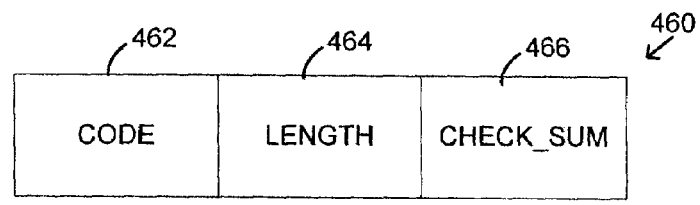
FIG. 6B is a block diagram of an exemplary embodiment of a packet that can be used for a protocol version request or a battery information request.

Referring now to FIG. 6B, shown therein is a block diagram of an exemplary embodiment of a packet 460 that can be used for a protocol version request packet or a battery information request packet. The packet 460 includes a CODE field 462, a LENGTH field 464, and a CHECK_SUM field 466.

The protocol version request is transmitted by the main processor 102 to request the protocol version of the smart battery 252. Accordingly, the CODE field 462 includes the code to identify a protocol version request. The LENGTH field 464 includes the value 3 since there are three bytes in the protocol version request packet 460. The battery processor 252 responds to the protocol version request packet with a protocol version response packet. The CHECK_SUM field 466 is used for error checking and can include one byte.

The battery information request packet is transmitted by the main processor 102 when information about the operation of the smart battery 130 is required. The smart battery 130 responds with a battery information response packet. In this case, the CODE field 462 includes the code that signifies that the packet 460 is a battery information request packet. The CODE field 462 can include one byte. The LENGTH field 464 includes 1 byte indicating that there are three bytes in the packet 460.

Figure 6C:
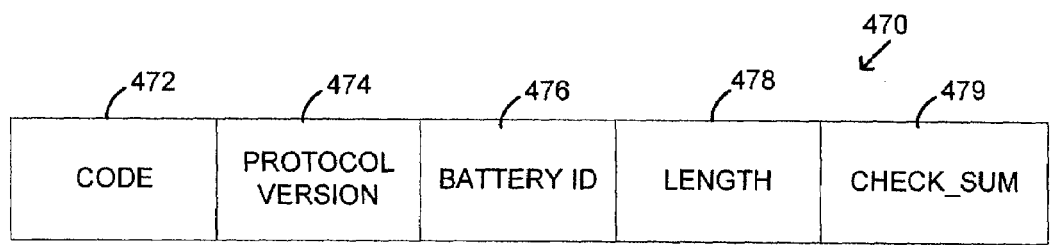
FIG. 6C is a block diagram of an exemplary embodiment of a protocol version response packet.

Referring now to FIG. 6C, shown therein is a block diagram of an exemplary embodiment of a protocol version response packet 470. The protocol version response packet 470 includes a CODE field 472, a first DATA field 474 including the protocol version, a second DATA field 476 including the battery ID, a LENGTH field 478 and a CHECK_SUM field 479. The battery processor 252 responds with the protocol version response packet 470 upon receiving the protocol version request packet 460 from the main processor 102, or any unrecognized code in the CODE field, or any error (e.g., bad length, bad check_sum, etc.). The protocol version response packet 470 provides the battery ID for the smart battery 252. Accordingly, in at least some implementations, the battery information can be cached in the smart battery 130, so that there is no need to download all of the battery information when only the battery ID is required.

The CODE field 472 includes the code that signifies that the packet 470 is a protocol version response packet. The CODE field 472 can include one byte. The first DATA field 474 includes the protocol version which is explained in more detail below. The first DATA field 474 can include 2 bytes and the second DATA field 476 can include two bytes. The LENGTH field 478 indicates that the packet 470 includes 1 byte indicating that there are seven bytes in the packet 470. The CHECK_SUM field 479 is used for error checking and can include one byte.

The protocol version is a number that indicates the version of the battery communication protocol that is being used. In some implementations, the protocol version can include an 8-bit major version number and an 8-bit minor version number. The minor version number can be increased for each "backwards compatible" change to the battery communication protocol. The major version number can be increased with each change that breaks backwards compatibility (this resets the minor version number to 0). For example, the major version number can increase if any one of the cryptographic algorithm, the private key, and the battery information format is changed.

Figure 6D:
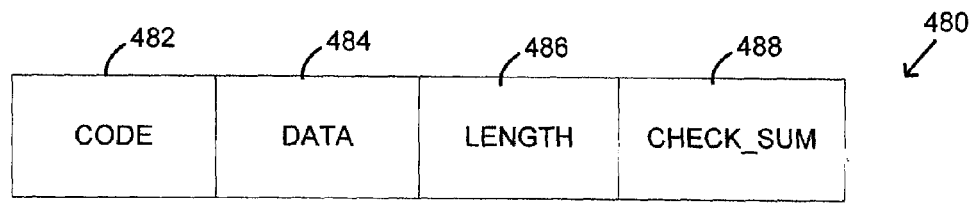
FIG. 6D is a block diagram of an exemplary embodiment of a packet that can be used for a battery authentication challenge, a battery authentication response or a battery information response.

Referring now to FIG. 6D, shown therein is a block diagram of an exemplary embodiment of a packet 480 that can be used for battery authentication challenge, battery authentication response or battery information response. The packet 480 includes a CODE field 482, a DATA field 484, a LENGTH field 486 and a CHECK_SUM field 488.

In the case of a battery authentication challenge, the main processor 102 can request battery authentication by sending a battery authentication challenge to the battery processor 252. The battery processor 252 can then respond with a battery authentication response packet after computing the data required by the battery authentication response challenge. The CODE field 482 includes the code that signifies that the packet 480 is a battery authentication challenge packet. The CODE field 482 can include one byte. The DATA field 484 includes a challenge message for the smart battery 130. In some implementations, the challenge message can include 4 bytes; accordingly, the challenge can be a 32-bit challenge. The LENGTH field 486 includes 1 byte indicating that there are seven bytes in the packet 480. The CHECK_SUM field 488 is used for error checking and can include one byte. The authentication process that is used is described in more detail below.

In the case of a battery authentication response, upon receiving a battery authentication challenge packet from the main processor 102, the battery processor 252 then responds with the battery authentication response packet after computing the data required by the battery authentication response challenge. In this case, the CODE field 482 includes the code that signifies that the packet 480 is a battery authentication response packet. The CODE field 482 can include one byte. The DATA field 484 includes a challenge response from the smart battery 130. In some implementations, the challenge response can include 4 bytes; accordingly, the challenge response can be a 32-bit value. The LENGTH field 486 includes 1 byte indicating that there are seven bytes in the packet 480. The CHECK_SUM field 488 is used for error checking and can include one byte. The authentication process that is used is described in more detail below.

In the case of a battery information response, upon receiving a battery information request packet from the main processor 102, the battery processor 252 responds with the battery information response. In this case, the CODE field 482 includes the code that signifies that the packet 480 is a battery information response packet. The CODE field 482 can include one byte. The DATA field 484 includes the battery information and can be 12 bytes long. The LENGTH field 486 includes 1 byte indicating that there can be fifteen bytes in the packet 480. The CHECK_SUM field 488 is used for error checking and can include one byte.

Figure 7A:
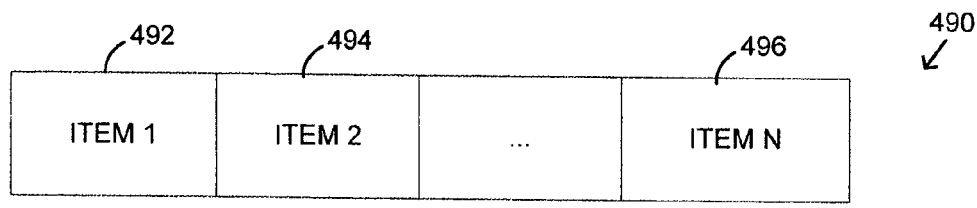
FIG. 7A is a block diagram of an exemplary embodiment of a battery information data construct.
Figure 7B:
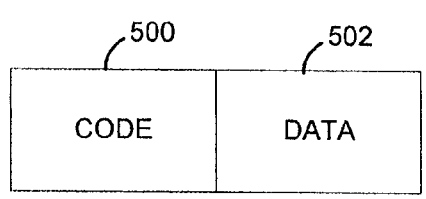
FIG. 7B is a block diagram of an exemplary embodiment of a battery charge/discharge data construct.

Referring now to FIG. 7A, shown therein is a block diagram of an exemplary embodiment of a battery information data construct 490. The battery information data construct 490 is a packet of a variable number of item fields 492-496 that contain data about the smart battery 130. For instance, the item fields 492-496 can include information for a LUT for a battery charge curve. Each item field 492-496 can have the format shown in FIG. 7B and can include a CODE field 500 and a DATA field 502. The CODE field 500 can include an 8-bit identifier that identifies the type of item data such as battery charge curve for example. The DATA field 502 is dependent upon the specific item. Fixed length items do not require a LENGTH field. However, variable length items will include a LENGTH field (not shown) inserted between the CODE field 500 and the DATA field 502. In an alternative, rather than transmitting the battery ID in the protocol version response packet, the battery ID can be transmitted in one of the items 492-496. If one of the items 492-496 contains battery profile information such as battery charge curve information, then the CODE field 500 includes a code to indicate battery charge curve information, and the LENGTH field (not shown) includes the number of bytes in the packet including the CODE, LENGTH and DATA fields. The DATA field 502 contains enough bytes to represent the battery charge curve information.

As previously mentioned, the smart battery 130 can execute a cryptographic algorithm during authentication with the main processor 102. Based on a private key located securely only within the memory of the smart battery 130 and a challenge provided by the main processor 102, the smart battery 130 can produce a response by applying the cryptographic algorithm. In some implementations, the private key can be 64 bits and the challenge can be 32 bits. Different sizes may be selected for the private key and the challenge provided that a suitable level of security is provided. In some implementations, the challenge can be encrypted and the smart battery 130 can execute a decryption algorithm to decrypt the challenge and then combine the challenge with the private key to produce the response. Other data transmitted between the main processor 102 and the smart battery 130 can also be encrypted.

The smart battery 130 has been specially designed to be tamper resistant and include custom hardware and code protection registers for this purpose. Accordingly, it is very difficult for a third party to extract the private key from the smart battery 130. However, the same is not true of the mobile device 100. Accordingly, the private key is not stored in the mobile device 100. Instead, a unique (per device) pre-computed challenge and response pair based on a private key and a cryptographic algorithm can be stored in the mobile device 100 during manufacturing. Accordingly, different challenge and response pairs can be stored on different mobile devices. The private key and the cryptographic algorithm is then only stored in the smart battery 130. While it may be possible to create a counterfeit battery that can operate in a single mobile device, it will be very difficult to create counterfeit batteries that can operate with all mobile devices that utilize this authentication process. In some implementations, several challenge and response pairs can be stored on the mobile device 100 and at least one of the pairs can be used during authentication.

Figure 8:
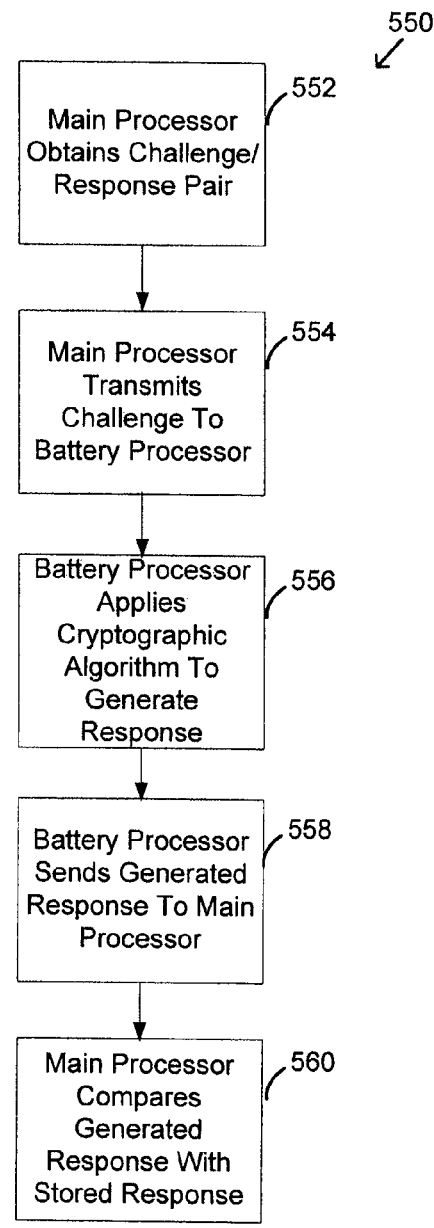
FIG. 8 is a flowchart of an exemplary embodiment of an authentication process employed by the main processor of the mobile communications device of FIG. 1 to authenticate the smart battery.

Referring now to FIG. 8, shown therein is a flowchart of an exemplary embodiment of an authentication process 550 that can be employed by the main processor 102 to authenticate the smart battery 130. Authentication is done each time the mobile device 100 is turned on and each time a battery is inserted into the mobile device 100. At step 552, the main processor 102 reads a memory element on the mobile device 100 to obtain a challenge and response pair. At step 554, the main processor 102 transmits the challenge to the battery processor 252. At step 556, the battery processor 252 applies the cryptographic algorithm using a private key to generate a response and at step 558, the battery processor 252 sends the response to the main processor 102. At step 560, the main processor 102 compares the generated response with the stored response. At this step, if the stored response is identical to the response generated by the battery processor 252 then the smart battery 130 is verified to be authentic. If not, the smart battery is not verified to be authentic and appropriate steps are taken. Due to the possibility of a transmission error (and the possibility of an incorrect CHECK_SUM), the main processor 102 can make several challenge and response attempts before identifying the battery pack as a counterfeit battery or a non-authorized third party battery pack.

If the battery pack is identified as a counterfeit battery or a non-authorized third party battery pack, then the operating system associated with the main processor 102 can set a BSTAT_INSECURE battery status but continue the normal boot process. The main processor 102 can also execute software that provides user feedback, controls radio access, and prevents the mobile device 100 from running for more than a short time, etc. The main processor 102 will not charge, or charge to a full capacity, a non-authentic battery pack, i.e. a battery pack that fails the authentication process. However, in some implementations, prior to authentication, charging of a freshness seal (i.e. a battery that is in an under-voltage condition) can be allowed until the battery termination voltage is approximately 3.0 V. The under-voltage condition occurs when the battery has been discharged so that the termination voltage is about 2.5 V and the protection circuitry in the battery has disconnected the battery terminals from the battery module. The battery remains in this state until a charging voltage is applied to the battery terminals. Charging the battery to a minimum charge capacity so that the termination voltage is about 3.0 V is considered safe assuming that there are no battery packs having a charge capacity lower than that of a 3.0 V battery pack. However, in other embodiments, if the battery pack is identified as a counterfeit battery or a non-authorized third party battery pack, then the operating system associated with the main processor 102 can be configured to not allow the normal boot process to proceed. Instead, the operating system can be configured to provide an indication that there is something wrong with the battery; for instance, the operating system can display a screen that shows a battery with a line through it, or another suitable graphical indication.

Figure 9:
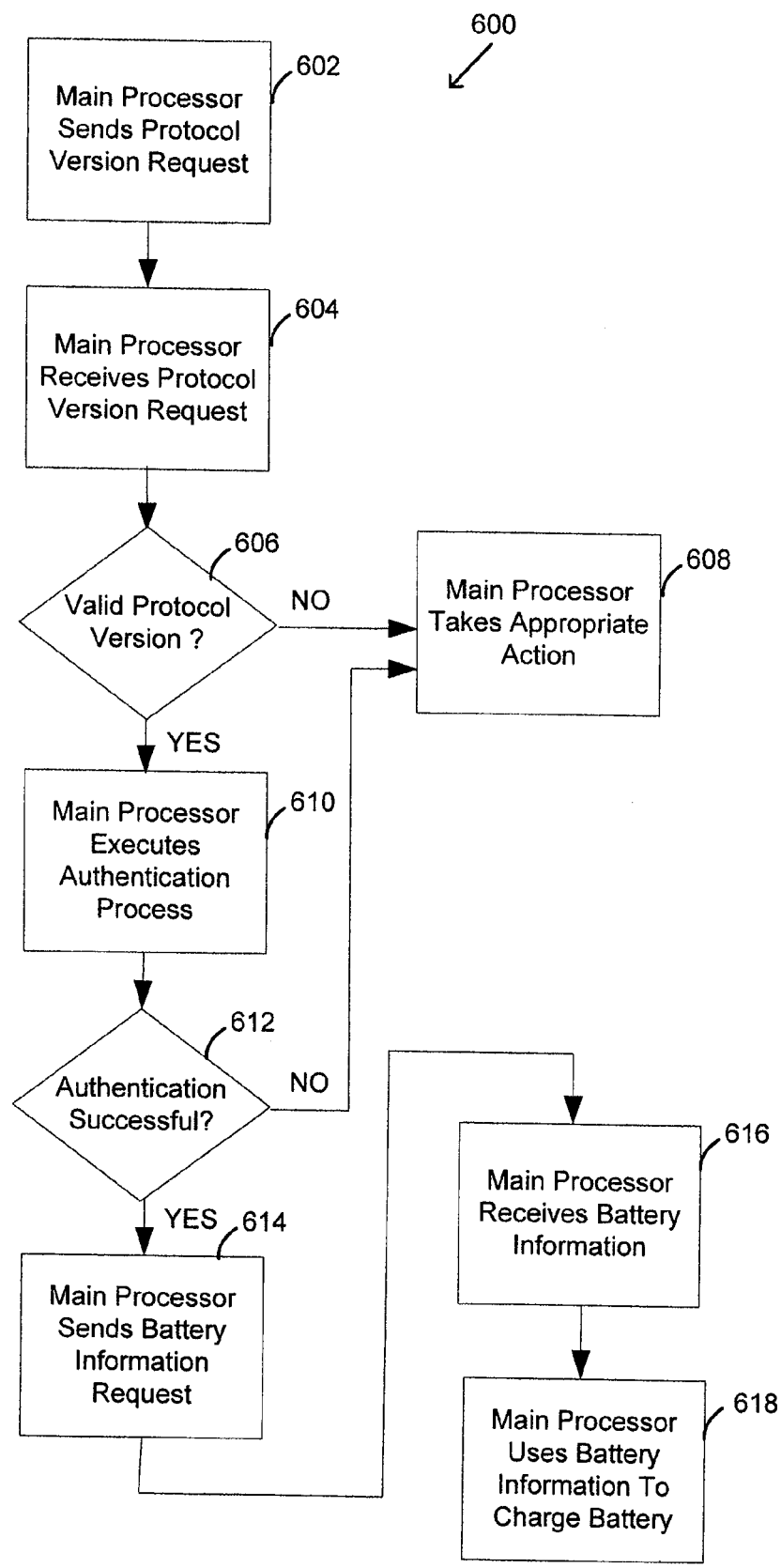
FIG. 9 is a flowchart showing the typical operation of the mobile communications device having a smart battery that may or may not be authentic.

Referring now to FIG. 9, shown therein is a flowchart 600 showing the typical operation of the mobile communication device 100 having a smart battery that may or may not be authentic. Upon startup of the mobile device 100, or when battery insertion is detected, the main processor 102 can perform the following steps. At step 602, the main processor 102 sends a protocol version request packet to the battery processor 252. At step 604, the battery processor 252 generates and sends a protocol version response packet to the main processor 102. At step 606, the main processor 102 compares the protocol version in the protocol version response packet with supported protocols and continues to step 610 if the protocol version number is compatible.

If the protocol version number is not compatible, then at step 608, the main processor 102 performs the actions previously described for non-authentic battery packs and stops or limits (as previously described) any charging activities that may have begun. For instance, the mobile device 100 can show a "no battery icon", even though there is a battery. In some cases, the main processor 102 can allow the mobile device 100 to continue operating for a fixed period of time such as X minutes, but not allow charging or not allow charging to a full capacity. Charging is the greatest risk for use of a counterfeit or non-qualified battery. Allowing X minutes of use could allow the user to make an emergency phone call while using a counterfeit battery that he/she has unknowingly bought.

At step 610, the main processor 102 performs the authentication process 550. At step 612, if the battery authentication is successful then the process 600 moves to step 614. Otherwise, the process 600 moves to step 608. At step 614, the main processor 102 can send a battery information request packet to the battery processor 252. At step 616, the battery processor 252 accesses the requested battery information and generates a battery information response packet which is then sent to the main processor 102. At step 618, the main processor 102 can use the battery information to charge the smart battery 130 or to monitor the smart battery 130 during operation to provide the user with an indication of remaining charge, etc. It should be noted that while steps for data transmission errors and communication retries are not explicitly shown in the process 600, they can be included in the process 600.

Figure 10:
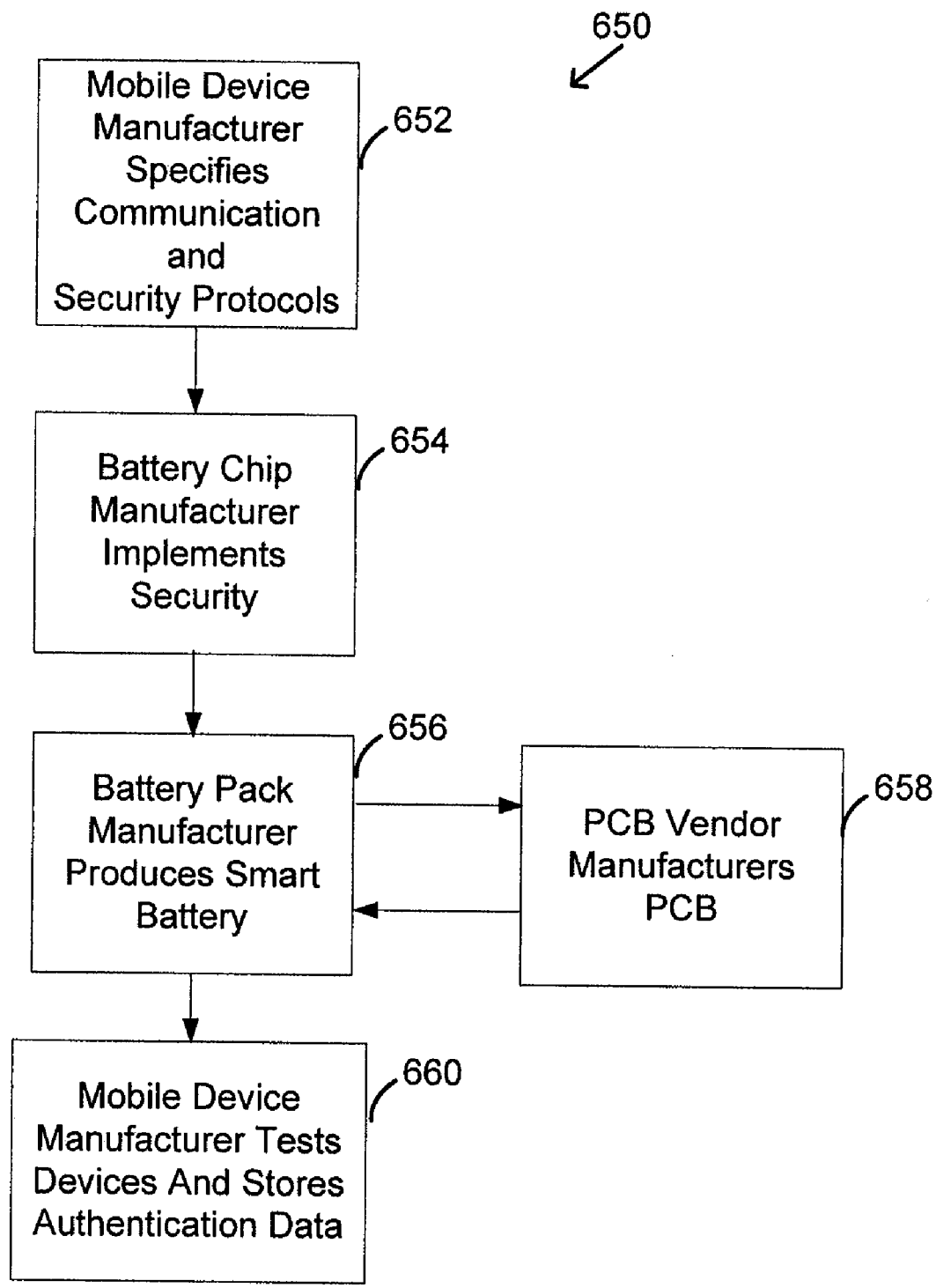
FIG. 10 is a flowchart of an exemplary manufacturing process for manufacturing a mobile communication device having a smart battery.

Referring now to FIG. 10, shown therein is a flowchart of an exemplary manufacturing process 650 for manufacturing a mobile communication device 100 having a smart battery 130. At step 652, a communication protocol and security protocol is specified for the smart battery 130. At step 654, a manufacturer of the smart battery 130 incorporates code for implementing the communication protocol and the security protocol into the smart battery 130. At steps 656 and 658, a manufacturer of battery packs, along with a Printed Circuit Board (PCB) vendor, puts together the hardware (i.e. circuitry) for the smart battery 130. At step 660, the smart batteries 130 are then tested with the mobile devices 100. Further, at step 660, the smart batteries and mobile devices are paired up. For each pair, several unique challenge and response pairs are generated based on a private key and a cryptographic algorithm. The challenge and response pairs are stored on the mobile devices and the corresponding private key and the cryptographic algorithm is stored on the corresponding smart batteries.

In one aspect, at least one of the embodiments described herein provides a mobile communication device comprising a main processor for controlling the operation of the mobile communication device; a device memory coupled to the main processor, the device memory being adapted for storing first and second portions of security information used for authentication; and a smart battery coupled to the main processor, the smart battery being adapted to provide supply power to the mobile device. The smart battery comprises: a battery processor for controlling the operation of the smart battery and communicating with the main processor; and a battery memory coupled to the battery processor, the battery memory being adapted for storing information including a third portion of security information used for authentication. The main processor is configured to send an authentication request including the first portion of security information to the battery processor, and the battery processor is configured to generate a response based on the first and third portions of security information and send the generated response to the main processor, wherein the smart battery is authenticated if the generated response matches the second portion of security information.

The first and second portions of security information are different than the third portion of security information.

The first portion of security information includes a pre-computed challenge, the second portion of information includes a corresponding pre-computed response generated by operating on the pre-computed challenge with a cryptographic method and a private key, and the third portion of information includes the cryptographic method and the private key, wherein the cryptographic method and the private key are only stored in the smart battery.

After the authentication request is made by the main processor, the battery processor is configured to generate a response based on the pre-computed challenge, the private key and the cryptographic method, wherein the smart battery is authenticated if the generated response matches the corresponding pre-computed response stored on the device memory.

The first and second portions of security information stored in the device memory can be unique compared to first and second portions of security information stored on other similar mobile communication devices.

If the smart battery fails authentication, the main processor can be configured to allow charging of the smart battery up to a minimum charge capacity if there is an under-voltage condition.

Alternatively, if the smart battery fails authentication, the main processor can be configured to allow the mobile device to continue operating for a limited time duration and not to allow charging of the smart battery.

Several sets of first and second portions of security information can be stored on the device memory and the main processor can be configured to perform authentication on the smart battery using one or more of the several sets of first and second portions of security information.

The main processor and the smart battery are coupled via a data line that can have a maximum data rate of approximately 300 bits per second.

In another aspect, at least one of the embodiments described herein provides a method for authenticating a smart battery for use with a mobile communication device that includes a main processor, a device memory and the smart battery including a battery processor and a battery memory. The method comprises:

storing first and second portions of security information used for authentication on the device memory;
  storing a third portion of security information used for authentication on the battery memory;
  sending an authentication request and the first portion of security information from the main processor to the smart battery;
  generating a response at the smart battery based on the first and third portions of security information and sending the generated response to the main processor; and
  comparing the generated response with the second portion of security information at the main processor and authenticating the smart battery if the generated response matches the second portion of security information.

The first portion of security information includes a pre-computed challenge, the second portion of information includes a corresponding pre-computed response generated by operating on the pre-computed challenge with a cryptographic method and a private key, and the third portion of information includes the cryptographic method and the private key.

In the case of non-authentication, the method can comprise repeating authentication several times to ensure that non-authentication is not due to a data transmission error for data transmission between the main processor and the battery processor.

The method can comprise storing unique first and second portions of security information in the device memory in comparison to first and second portions of security information stored on other similar mobile communication devices.

If the smart battery fails authentication, then the method can comprise allowing charging of the smart battery up to a minimum charge capacity if there is an under-voltage condition.

If the smart battery fails authentication, then the method can comprise allowing operation of the mobile communication device to continue for a limited time duration and not allowing charging of the smart battery.

The method can comprise storing several sets of first and second portions of security information on the device memory and performing authentication on the smart battery using one or more of the several sets of first and second portions of security information.

The method can comprise coupling the main processor and the smart battery with a data line having a maximum data rate of approximately 300 bits per second.

The method can comprise preventing charging of the smart battery if authentication fails.

The method can comprise encrypting the pre-computed challenge.

The method can comprise generating a random number for the pre-computed challenge.

In another aspect, at least one of the embodiments described herein provides a method of manufacturing a smart battery for use with a mobile communication device. The method comprises:

specifying communication and security protocols for the smart battery for permitting the mobile communication device to communicate with and authenticate the smart battery;
  assembling the smart battery;
  implementing the security and communication protocols on the smart battery including storing a private key and a cryptographic method on secure memory only within the smart battery;
  storing challenge and response pairs that correspond to the private key and the cryptographic method on the mobile device; and
  testing the security and communication protocols between the mobile communication and the smart battery.

It should be understood that various modifications can be made to the embodiments described and illustrated herein, without departing from the embodiments, the general scope of which is defined in the appended claims. For instance, while the embodiments described herein generally relate to a mobile communication device, those skilled in the art will recognize that the techniques and structures described herein can generally be applied to a mobile device that uses a smart battery, and the device does not necessarily have to be a mobile communication device. Furthermore, some of the elements of the exemplary embodiments described herein can be implemented in software or hardware or some combination thereof.

The invention claimed is:

1. A mobile communication device comprising:
  a main processor for controlling operation of the mobile communication device;
  a device memory coupled to the main processor, the device memory being adapted for storing first and second portions of security information used for authentication; and,
  a smart battery coupled to the main processor, the smart battery being adapted to provide supply power to the mobile device, the smart battery comprising:
    a battery processor for controlling operation of the smart battery and communicating with the main processor; and
    a battery memory coupled to the battery processor, the battery memory being adapted for storing information including a third portion of security information used for authentication;
  wherein the main processor is configured to send an authentication request including the first portion of security information to the battery processor, wherein the battery processor is configured to generate a response based on the first and third portions of security information and send the generated response to the main processor, wherein the smart battery is authenticated if the generated response matches the second portion of security information; and wherein the first portion of security information comprises a pre-computed challenge, wherein the second portion of security information comprises a corresponding pre-computed response generated by operating on the pre computed challenge with a cryptographic method and a private key, wherein the third portion of security information includes the cryptographic method and the private key, and wherein the cryptographic method and the private key are stored in the smart battery and not on the mobile communication device, and wherein the first and second portions of security information stored in the device memory are unique to the individual mobile communication device.

2. The mobile communication device of claim 1, wherein the first and second portions of security information are different than the third portion of security information.

3. The mobile communication device of claim 1, wherein after the authentication request is made by the main processor, the battery processor is configured to generate a response based on the pre-computed challenge, the private key and the cryptographic method, wherein the smart battery is authenticated if the generated response matches the corresponding pre-computed response stored on the device memory.

4. The mobile communication device of claim 1, wherein if the smart battery fails authentication, the main processor is configured to allow charging of the smart battery up to a minimum charge capacity if there is an under-voltage condition.

5. The mobile communication device of claim 1, wherein if the smart battery fails authentication, the main processor is configured to allow the mobile device to continue operating for a limited time duration and not to allow charging of the smart battery.

6. The mobile communication device of claim 1, wherein several sets of first and second portions of security information are stored on the device memory and wherein the main processor is configured to perform authentication on the smart battery using one or more of the several sets of first and second portions of security information.

7. The mobile communication device of claim 1, wherein the main processor and the smart battery are coupled via a data line with a maximum data rate of approximately 300 bits per second.

8. A method for authenticating a smart battery for use with a mobile communication device that includes a main processor, a device memory and the smart battery including a battery processor and a battery memory, wherein the method comprises:

storing first and second portions of security information used for authentication on the device memory;

storing a third portion of security information used for authentication on the battery memory but not on the mobile communication device;

sending an authentication request and the first portion of security information from the main processor to the smart battery;

generating a response at the smart battery based on the first and third portions of security information and sending the generated response to the main processor; and comparing the generated response with the second portion of security information at the main processor and authenticating the smart battery if the generated response matches the second portion of security information;

wherein the first portion of security information comprises a pre-computed challenge, wherein the second portion of security information comprises a corresponding pre-computed response generated by operating on the pre-computed challenge with a cryptographic method and a private key, and wherein the third portion of security information includes the cryptographic method and the private key, and wherein the first and second portions of security information stored in the device memory are unique to the individual mobile communication device.

9. The method of claim 8, wherein in the case of non-authentication, the method comprises repeating authentication several times to ensure that non-authentication is not due to a data transmission error for data transmission between the main processor and the battery processor.

10. The method of claim 8, wherein if the smart battery fails authentication, then the method comprises allowing charging of the smart battery up to a minimum charge capacity if there is an under-voltage condition.

11. The method of claim 8, wherein if the smart battery fails authentication, then the method comprises allowing operation of the mobile communication device to continue for a limited time duration.

12. The method of claim 8, wherein the method comprises storing several sets of first and second portions of security information on the device memory and performing authentication on the smart battery using one or more of the several sets of first and second portions of security information.

13. The method of claim 8, wherein the method comprises coupling the main processor and the smart battery with a data line having a maximum data rate of approximately 300 bits per second.

14. The method of claim 8, wherein the method comprises preventing charging of the smart battery if authentication fails.

15. The method of claim 8, wherein the method comprises encrypting the pre-computed challenge.

16. The method of claim 8, wherein the method comprises generating a random number for the pre-computed challenge.

17. A method of manufacturing a smart battery for use with a mobile communication device, wherein the method comprises:

specifying communication and security protocols for the smart battery for permitting the mobile communication device to communicate with and authenticate the smart battery;

implementing the security and communication protocols on the smart battery including storing a private key and a cryptographic method on secure memory within the smart battery and not on a device memory of the mobile communication device; and storing challenge and response pairs that correspond to the private key and the cryptographic method on the mobile communication device, wherein the challenge and response pairs stored in the device memory are unique to the individual mobile communication device.

* * * * *